United States Patent
Kim et al.

(10) Patent No.: US 10,206,155 B2
(45) Date of Patent: Feb. 12, 2019

(54) METHOD AND USER EQUIPMENT FOR PERFORMING NETWORK SELECTION AND TRAFFIC ROUTING

(71) Applicant: LG ELECTRONICS INC., Seoul (KR)

(72) Inventors: Hyunsook Kim, Seoul (KR); Laeyoung Kim, Seoul (KR); Jinsook Ryu, Seoul (KR); Jaehyun Kim, Seoul (KR); Taehun Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/560,127

(22) PCT Filed: Mar. 4, 2016

(86) PCT No.: PCT/KR2016/002190
§ 371 (c)(1),
(2) Date: Sep. 20, 2017

(87) PCT Pub. No.: WO2016/159522
PCT Pub. Date: Oct. 6, 2016

(65) Prior Publication Data
US 2018/0103405 A1     Apr. 12, 2018

Related U.S. Application Data

(60) Provisional application No. 62/141,266, filed on Apr. 1, 2015, provisional application No. 62/143,228, filed on Apr. 6, 2015.

(51) Int. Cl.
*H04W 36/22*     (2009.01)
*H04W 8/08*     (2009.01)
(Continued)

(52) U.S. Cl.
CPC .............. *H04W 36/22* (2013.01); *H04W 8/08* (2013.01); *H04W 28/08* (2013.01);
(Continued)

(58) Field of Classification Search
CPC ....... H04W 36/22; H04W 76/36; H04W 8/08; H04W 28/08; H04W 36/0016;
(Continued)

(56) References Cited

U.S. PATENT DOCUMENTS

| 2012/0257598 A1 | 10/2012 | Karampatsis et al. |
| 2013/0294356 A1 | 11/2013 | Bala et al. |

(Continued)

FOREIGN PATENT DOCUMENTS

WO     2014119966     8/2014

OTHER PUBLICATIONS

PCT International Application No. PCT/KR2016/002190, International Search Report dated Jun. 10, 2016, 2 pages.
(Continued)

*Primary Examiner* — Marisol Figueroa
(74) *Attorney, Agent, or Firm* — Lee, Hong, Degerman, Kang & Waimey

(57) ABSTRACT

The present description discloses a method for performing network selection and traffic routing by a mobility management entity (MME). The method comprises the steps of: if a request for a public data network (PDN) connection is received from a user equipment (UE), an MME deciding whether or not the PDN connection is to be offloaded to a wireless local area network (WLAN) on the basis of an indication for WLAN offloadability obtained from a home subscriber server (HSS); the MME transmitting to the UE a message comprising information about a network-based IP flow mobility (NBIFOM) function and the decision result with respect to the PDN connection; and the MME trans- (Continued)

mitting the decision result with respect to the PDN connection to a PDN gateway (P-GW) and/or a policy and charging rules function (PCRF), wherein the decision result with respect to the PDN connection and the information about the NBIFOM function can be used for triggering any one of the UE, P-GW and PCRF such that the NBIFOM function is suspended or resumed.

18 Claims, 20 Drawing Sheets

(51) Int. Cl.
  *H04W 28/08* (2009.01)
  *H04W 36/00* (2009.01)
  *H04W 40/36* (2009.01)
  *H04W 48/18* (2009.01)
  *H04W 88/06* (2009.01)
  *H04W 74/08* (2009.01)
  *H04W 76/36* (2018.01)
  *H04W 84/12* (2009.01)
  *H04W 36/08* (2009.01)
  *H04W 28/02* (2009.01)

(52) U.S. Cl.
  CPC ....... *H04W 36/0016* (2013.01); *H04W 40/36* (2013.01); *H04W 48/18* (2013.01); *H04W 74/0858* (2013.01); *H04W 76/36* (2018.02); *H04W 88/06* (2013.01); *H04W 28/0236* (2013.01); *H04W 36/08* (2013.01); *H04W 84/12* (2013.01)

(58) Field of Classification Search
  CPC . H04W 40/36; H04W 48/18; H04W 74/0858; H04W 88/06; H04W 28/0236; H04W 36/08; H04W 84/12
  See application file for complete search history.

(56) References Cited

U.S. PATENT DOCUMENTS

| | | | |
|---|---|---|---|
| 2014/0023004 A1 | 1/2014 | Kumar et al. | |
| 2014/0082697 A1* | 3/2014 | Watfa | H04W 76/15 726/3 |
| 2014/0204909 A1 | 7/2014 | Cheng et al. | |
| 2015/0023276 A1 | 1/2015 | Takeda et al. | |
| 2015/0215903 A1 | 7/2015 | Zhao et al. | |
| 2015/0271862 A1 | 9/2015 | Lee | |
| 2017/0134986 A1* | 5/2017 | Jeong | H04W 28/10 |
| 2017/0339614 A1* | 11/2017 | Kim | H04W 8/20 |
| 2018/0014346 A1* | 1/2018 | Gupta | H04W 76/16 |

OTHER PUBLICATIONS

Huawei, et al., "Clarification of WLAN offload indication from MME in E-UTRAN", S2-143431, 3GPP TSG SA WG2 Meeting #105, Oct. 2014, 22 pages.

Samsung, "Solution for NBIFOM", TD S2-142606, 3GPP TSG SA WG2 Meeting #104, Jul. 2014, 3 pages.

United States Patent and Trademark Office Application U.S. Appl. No. 15/559,796, Office Action dated Aug. 29, 2018, 11 pages.

* cited by examiner

METHOD AND USER EQUIPMENT FOR PERFORMING NETWORK SELECTION AND TRAFFIC ROUTING

CROSS-REFERENCE TO RELATED APPLICATIONS

This application is the National Stage filing under 35 U.S.C. 371 of International Application No. PCT/KR2016/002190, filed on Mar. 4, 2016, which claims the benefit of U.S. Provisional Application No. 62/141,266, filed on Apr. 1, 2015 and 62/143,228, filed on Apr. 6, 2015, the contents of which are all hereby incorporated by reference herein in their entirety.

BACKGROUND OF THE INVENTION

Field of the Invention

The present invention relates to a mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefore, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| Reference point | Description |
| --- | --- |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 4b.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, with an explosive increase in data in recent years, a 3GPP access of a mobile communication operator is becoming more congested. As a way of solving this problem, there is an attempt to offload data of a user equipment (UE) through a WLAN which is a non-3GPP access. Hereinafter, an architecture for connecting the WLAN to an EPC is described.

FIG. 6a and FIG. 6b illustrate an architecture for connecting a WLAN to an EPC.

FIG. 6a illustrates an architecture in which a WLAN is connected to a P-GW through an S2a interface. As can be seen with reference to FIG. 6a, a WLAN access network (in particular, it is a trusted WLAN access network since the S2a interface is an interface for connecting a trusted non-3GPP access to the EPC) is connected to the P-GW through the S2a interface. The content disclosed in TS 23.402 is incorporated herein by reference for an architecture for a trusted WLAN access network (TWAN).

FIG. 6b illustrates an architecture in which a WLAN is connected to a P-GW through an S2b interface. As can be seen with reference to FIG. 6b, a WLAN access network (in particular, it is an untrusted WLAN access network since the S2b interface is an interface for connecting an untrusted non-3GPP access to the EPC) is connected to the P-GW through an evolved packet data gateway (ePDG) connected to the P-GW through the S2b interface.

Hereinafter, a trusted WLAN and an untrusted WLAN may be both referred to as a WLAN.

Meanwhile, with a trend for offloading data of a UE not through a 3GPP access of an operator but through a WLAN which is a non-3GPP access, a technology such as IP flow mobility and seamless offload (IFOM), multi access PDN connectivity (MAPCON), or the like has been proposed to support a multiple radio access. The MAPCON technology is a technology of transmitting data by using a 3GPP access and a Wi-Fi access through respective PDN connections. The IFOM technology is a technology of transmitting data by aggregating the 3GPP access and the Wi-Fi access to one PDN or P-GW.

FIG. 7a is an exemplary diagram of the IFOM technology.

Referring to FIG. 7a, the IFOM technology is to provide the same PDN connection through several pieces of different access. Such IFOM technology provides seamless offloading onto a WLAN.

Furthermore, the IFOM technology provides the transfer of IP flows having the same one PDN connection from one access to the other access.

FIG. 7b is an exemplary diagram of the MAPCON technology.

As can be seen with reference to FIG. 7b, the MAPCON technology is to connect several PDN connections, easily, IP flows to other APNs through another access system.

In accordance with such MAPCON technology, the UE 10 can generate a new PDN connection on access that has not been used before. Alternatively, the UE 10 can generate a new PDN connection in one of several pieces of access that were used before. Alternatively, the UE 10 may transfer some of or all PDN connections to another access.

As described above, with the help of the technologies capable of offloading the traffic of UE onto a WLAN, the congestion of the core network of a mobile communication service provider can be reduced.

The provider provides a policy to the UE in order to divert the traffic onto a general data communication network and the UE may divert data thereof onto the wireless LAN according to the policy.

In order to provision the policy the UE, a 3GPP based access network discovery and selection function (ANDSF) is enhanced to provide a policy associated with the wireless LAN.

FIGS. 8*a* and 8*b* show network control entities for selecting an access network.

As can be seen with reference to FIG. 8*a*, the ANDSF may be present in the home network (Home Public Land Mobile Network (hereinafter called 'HPLMN')) of the UE 10. Furthermore, as can be seen with reference to FIG. 8*b*, the ANDSF may also be present in the Visited Public Land Mobile Network (hereinafter called 'VPLMN') of the UE 10. When the ANDSF is present in a home network as described above, it may be called an H-ANDSF 61. When the ANDSF is present in a visited network, it may be called a V-ANDSF 62. Hereinafter, the ANDSF 60 generally refers to the H-ANDSF 61 or the V-ANDSF 62.

The ANDSF can provide information about an inter-system movement policy, information for access network search, and information about inter-system routing, for example, a routing rule.

The aforementioned IFOM is performed by the UE's initiative decision and uses DSMIP (Dual Stack Mobile IP), a host-based mobility protocol.

A technology that provides IFOM through S2a and S2b interfaces using a GTP or a PMIP which is a network based protocol is referred to as network based IP flow mobility (NBIFOM).

However, various policies for offloading the traffic of the user exist as described above, and as a result, various policies may conflict with each other in the UE.

SUMMARY OF THE INVENTION

Accordingly, an object of the present invention is to present a method that can solve the aforementioned problem.

In an aspect, provided is a method for performing network selection and traffic routing. The method may be performed by a mobility management entity (MME) and comprise: deciding, by the MME, whether to offload a public data network (PDN) connection to a wireless local area network (WLAN) based on an indication for WLAN offloadability acquired from a home subscriber server (HSS) when a request for the PDN is received from a user equipment (UE); transmitting, by the MME and to the UE, a message including a decision result for the PDN connection and information on a network based IP flow mobility (NBIFOM) capability; and transmitting, by the MME, the decision result for the PDN connection to at least one of a PDN gateway (P-GW) and a policy and charging rule function (PCRF). Here, the decision result for the PDN connection and the information on the NBIFOM capability are used for at least one of the UE, the P-GW, and the PCRF to use the NBIFOM capability so as to suspend resume the NBIFOM capability.

The information on the NBIFOM capability may indicate that the NBIFOM capability is enabled to be performed, while when the decision result for the PDN connection indicates that the offloading to the WLAN is impossible, at least one of the UE, the P-GW, and the PCRF suspends the NBIFOM capability.

When an update request for the PDN connection is received from the UE or a request for a new PDN connection is received, the deciding of whether to offload to the WLAN, the transmitting to the UE, and the transmitting to at least one of the P-GW and the PCRF are performed again.

The transmitting to the UE and the transmitting to at least one of the P-GW and the PCRF are performed again and thereafter, the NBIFOM function may be enabled to be performed with respect to the information on the NBIFOM capability, which is transmitted again and when the decision result for the PDN connection, which is transmitted again indicates that it is possible to offload to the WLAN, at least one of the UE, the P-GW, and the PCRF decides whether to resume the NBIFOM capability.

In performing the transmitting to at least one of the P-GW and the PCRF again, only when the decision result for the PDN connection to be transmitted again has a result value contrary to the decision result for the PDN connection before performing the deciding of whether to offload to the WLAN, the transmitting to at least one of the P-GW and the PCRF is performed again.

In another aspect, provided is a method for performing network selection and traffic routing. The method may be performed by a mobility management entity (MME) and comprise: deciding, by the MME, whether to offload a PDN connection to a WLAN based on an indication for WLAN offloadability acquired from an HSS when a request for the PDN connection is received from a user equipment (UE); determining, by the MME, whether there is a conflict between a decision result for the PDN connection and an NBI capability; transmitting, by the MME, to the UE a message additionally including information indicating suspension of the NBIFOM capability based on whether there is the conflict in addition to the decision result for the PDN connection and the NBIFOM capability; and transmitting, by the MME, to at least one of a P-GW and a PCRF the information indicating the suspension of the NBIFOM capability based on whether there is the conflict or the message including the information.

In the determining of whether there is the conflict, when the information on the NBIFOM capability indicates that the NBIFOM capability is enabled to be performed, while the decision result for the PDN connection indicates that it is impossible to offload the PDN connection to the WLAN, it is determined that there is the conflict.

When an update request for the PDN connection is received from the UE or a request for a new PDN connection is received, the deciding of whether to offload to the WLAN and the determining of whether there is the conflict are performed again.

In the performing of the determining of whether there is the conflict again, when the information on the NBIFOM capability, which is newly received from the P-GW indicates that the NBIFOM capability is enabled to be performed and the decision result for the PDN connection which is decided again indicates that it is possible to offload the PDN connection to the WLAN, it is determined that the conflict is resolved.

In another aspect, provided is an apparatus for performing network selection and traffic routing. The apparatus may comprise: a transceiver; and a processor controlling the transceiver. The processor is configured to: decides whether to offload a PDN connection to a WLAN based on an indication for WLAN offloadability acquired from an HSS when a request for the PDN connection is received from a user equipment (UE); transmit to the UE a message including a decision result for the PDN connection and information on an NBIFOM capability; and perform a procedure for transmitting the decision result for the PDN connection to at least one of a P-GW and a PCRF. The decision result for the PDN connection and the information on the NBIFOM capability may be used for at least one of the UE, the P-GW, and the PCRF to use the NBIFOM capability so as to suspend resume the NBIFOM capability.

In another aspect, provided is an apparatus for performing network selection and traffic routing. The apparatus may comprise: a transceiver; and a processor controlling the transceiver. The processor may be configured to: decide whether to offload a PDN connection to a WLAN based on an indication for WLAN offloadability acquired from an HSS when a request for the PDN connection is received from a user equipment (UE); determine whether there is a conflict between a decision result for the PDN connection and an NBI capability; transmit to the UE a message additionally including information indicating suspension of the NBIFOM capability based on whether there is the conflict in addition to the decision result for the PDN connection and the NBIFOM capability; and perform a procedure for transmitting to at least one of a P-GW and a PCRF the information indicating the suspension of the NBIFOM capability based on whether there is the conflict or the message including the information.

According to a disclosure of the present invention, a problem in the related art can be solved.

While a policy regarding WALN offloadability of a provider of a visitation network is guaranteed to be flexibly set under a roaming environment, policies acquired by a UE can be prevented from conflicting with each other and a signaling for a request/rejection which may be issued due to the policy confliction can be reduced in advance.

Further, according to the disclosure of the present invention, using the signaling in an entire system is reduced to increase efficiency of network resource utilization.

BRIEF DESCRIPTION OF THE DRAWINGS

FIG. 14b is a signal flowchart exemplarily illustrating a modified example of the first description illustrated in FIG. 14a.

DESCRIPTION OF EXEMPLARY EMBODIMENTS

Figure 1:
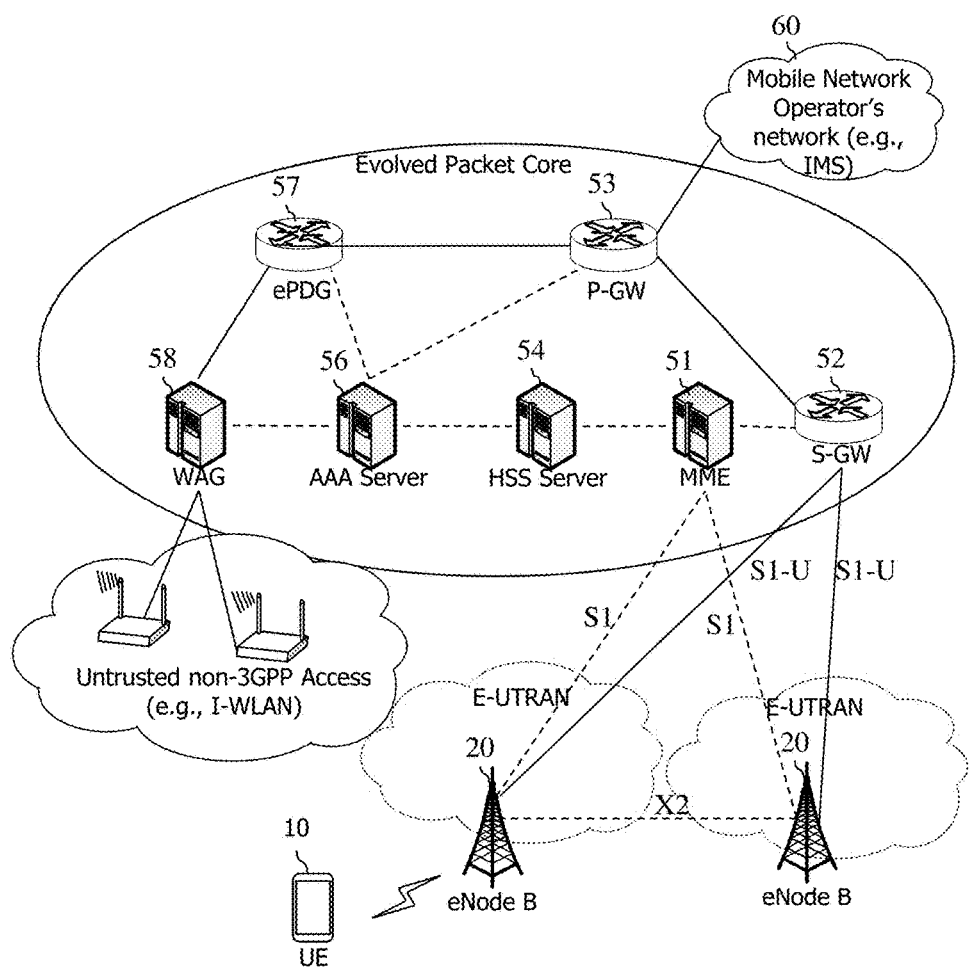
FIG. 1 is a structural diagram of an evolved mobile communication network.
Figure 2:
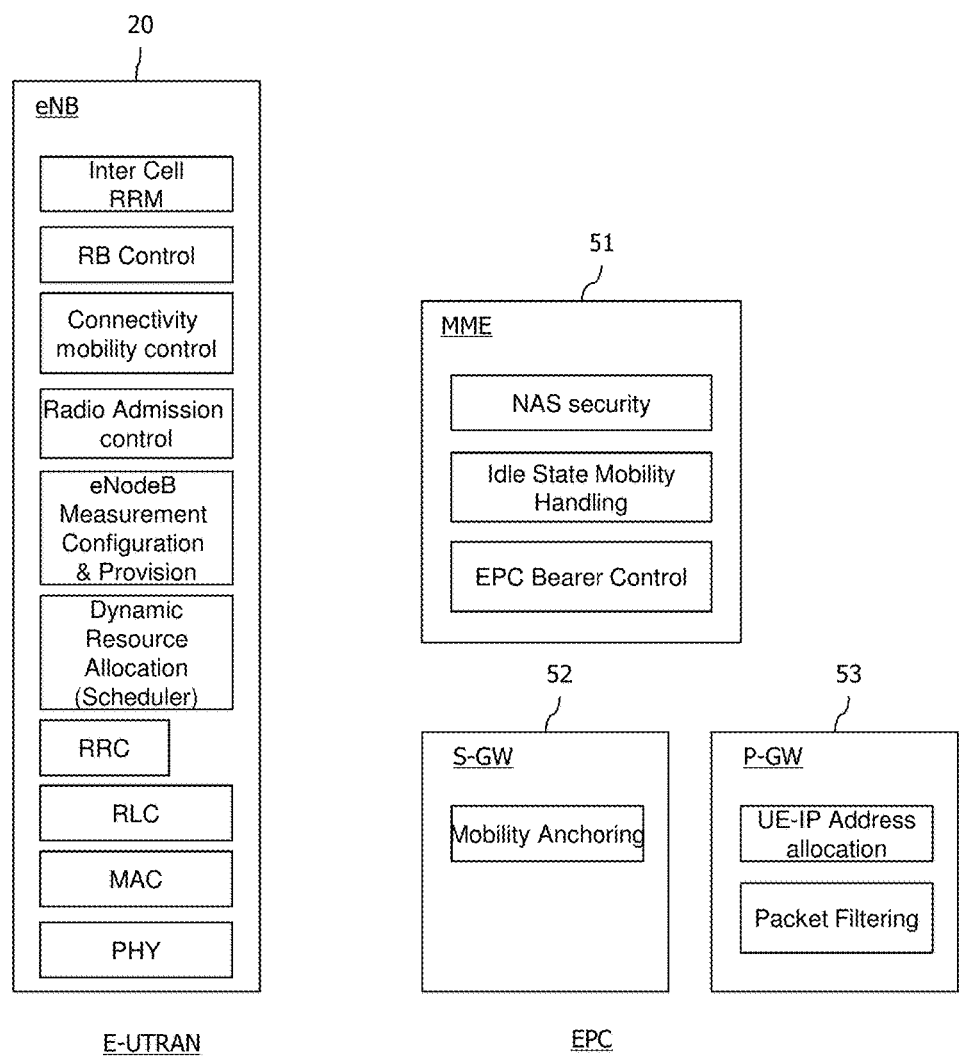
FIG. 2 is an exemplary diagram illustrating architectures of a general E-UTRAN and a general EPC.
Figure 3:
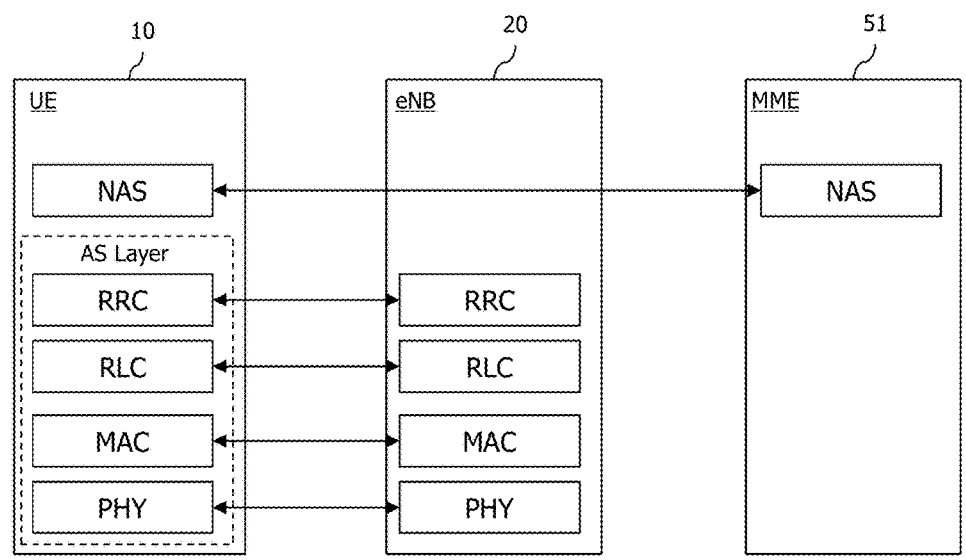
FIG. 3 is an exemplary diagram illustrating a structure of a radio interface protocol on a control plane between UE and eNodeB.
Figure 4:
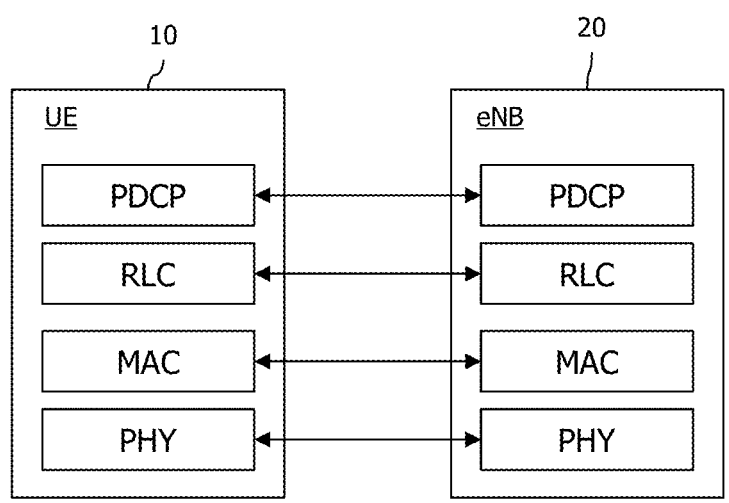
FIG. 4 is another exemplary diagram illustrating a structure of a radio interface protocol on a user plane between the UE and a base station.
Figure 5A:
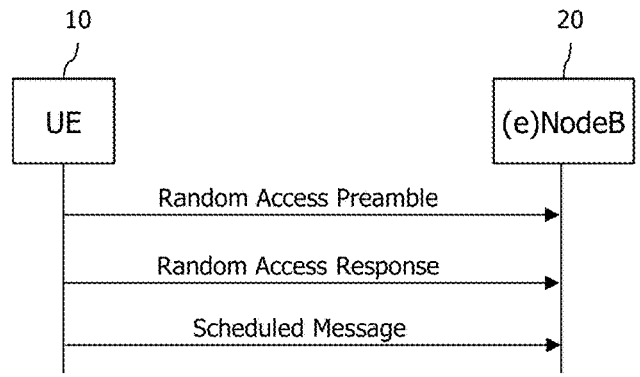
FIG. 5a is a flowchart illustrating a random access process in 3GPP LTE.
Figure 5B:
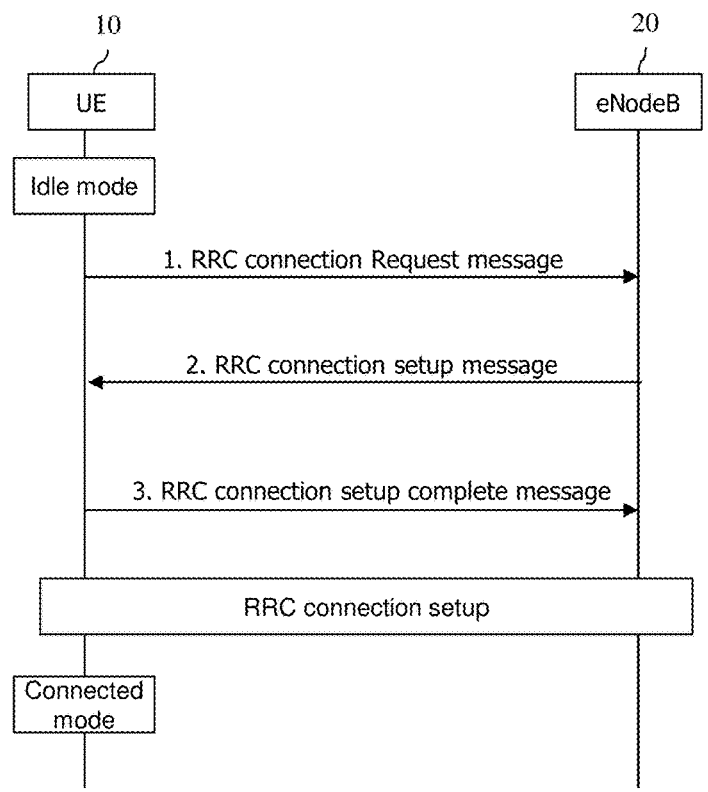
FIG. 5b illustrates a connection process in a radio resource control (RRC) layer.
Figure 6A:
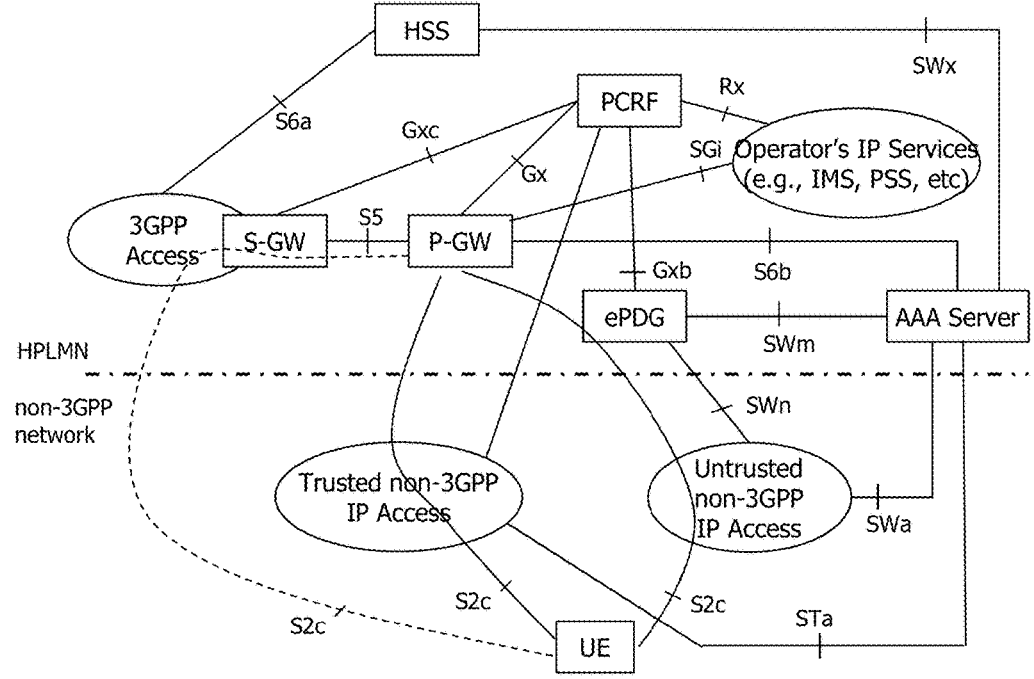
FIG. 6a and FIG. 6b illustrate an architecture for connecting a WLAN to an EPC.
Figure 6B:
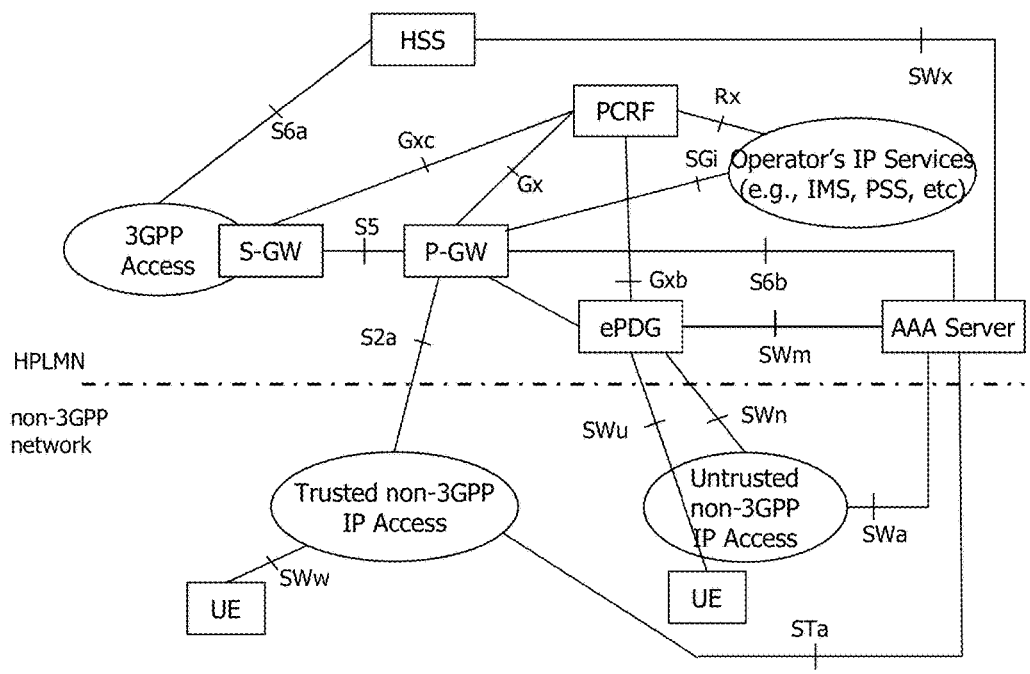
Figure 7A:
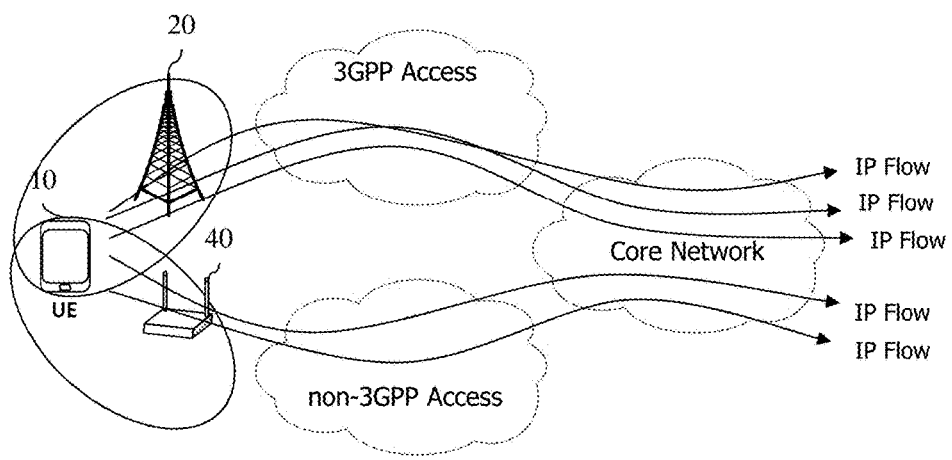
FIG. 7a is an exemplary diagram of the IFOM technology.
Figure 7B:
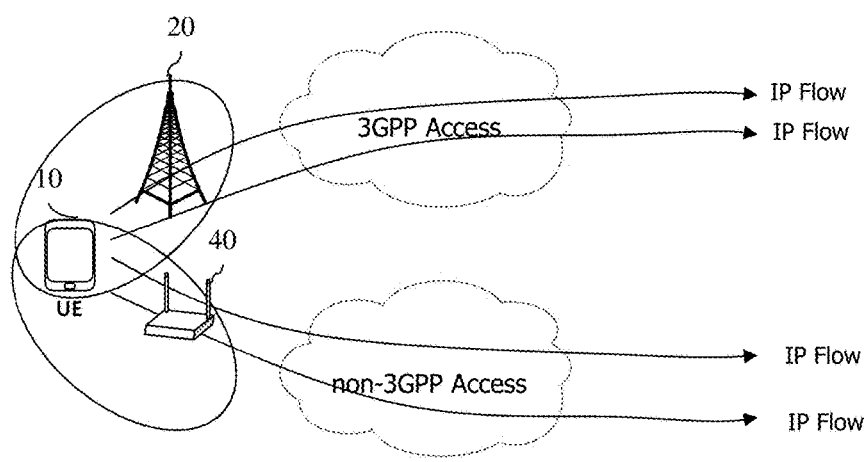
FIG. 7b is an exemplary diagram of the MAPCON technology.
Figure 8A:
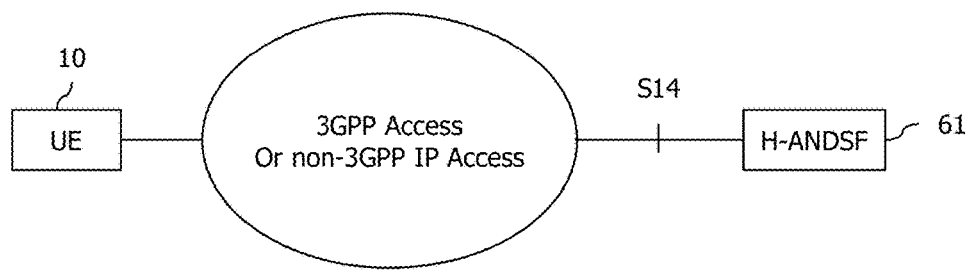
FIG. 8a and FIG. 8b illustrate network control entities for selecting an access network.
Figure 8B:
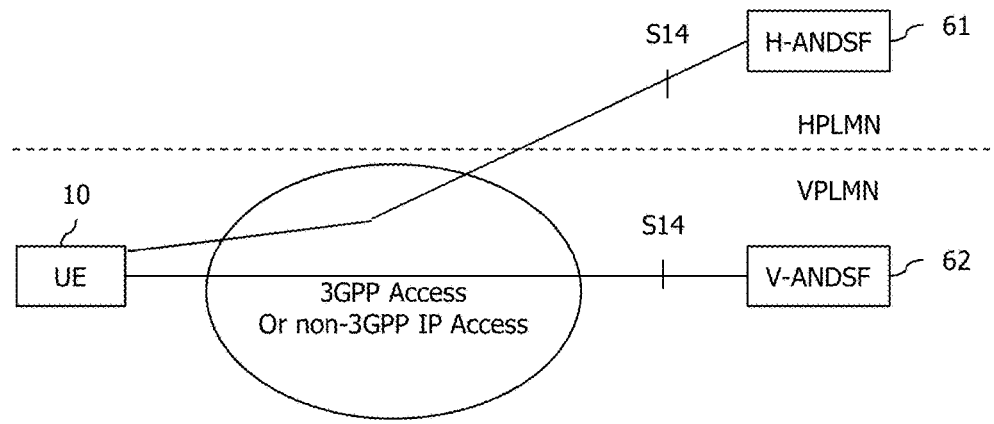

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Local Operating Environment Information: This is a set of implementation specific parameters which describe the local environment in which the UE is operating.

Presence Reporting Area: This is an area defined to report the presence of a UE in a 3GPP packet domain for the reasons of policy control and/or accounting or the like. In case of E-UTRAN, the presence reporting area consists of adjacent or not-adjacent tracking areas or a set of eNodeBs and/or cells. There are two types of presence reporting areas. One is a UE-dedicated presence reporting area, and the other is a presence reporting area predetermined by a core network.

ANDSF (Access Network Discovery and Selection Function): This is one of network entities for providing a policy for discovering and selecting an access that can be used by a UE on an operator basis.

ISRP (Inter-System Routing Policy): This is a rule defined by the operator to indicate which one will be used by the UE for routing of IP traffic among several radio access interfaces. The ISRP may include three types of rules as follows, as a policy for defining an access network preferred (i.e., having a high priority) or restricted to route/steer a packet service (or an IP flow or IP traffic or applications). That is, the ISRP may be divided into an IP flow mobility (IFOM) rule, a multi access PDN connectivity (MAPCON) rule, and a non-seamless WLAN offload (NSWO) rule as follows.

IFOM (IP Flow Mobility) rule: This rule is in regards to a list in which access technologies/access networks to be used by the UE are arranged according to a priority, when traffic matched to a specific IP traffic filter can be routed on a specific APN or on any APN. Further, this rule may designate for which radio access the traffic matched to the specific IP traffic filter is limited on the specific APN or on the any APN.

MAPCON (Multi Access PDN Connectivity) rule: This rule is a list in which the access technologies/access networks to be used by the UE are arranged according to the priority when a PDN connection for the specific APN can be routed. Further, this rule may designate for which radio access a PDN connection to a specific APN will be limited.

NSWO (Non-seamless WLAN offload) rule: This rule designates whether certain traffic will be offloaded or not offloaded non-seamlessly to a WLAN.

ISMP (Inter-System Mobility Policy): This is a set of rules defined by an operator to have an impact on an inter-system mobility decision made by the UE. When the UE can route IP traffic on a single radio access interface, the UE may use ISMP to select the most appropriate access technology type or access network in a given time.

RAN rule: This is to evaluate an RAN rule programmed in the UE and having radio access network (RAN) assistance parameters received from the network. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. In this case, the UE selects the WLAN and moves all offloadable PDN connections to the WLAN. Alternatively, when the RAN rule for moving the traffic to the 3GPP access is satisfied, the AS layer of the UE delivers a move-traffic-from-WLAN indication to the higher layer of the UE. In this case, the UE moves all PDN connections on the WLAN through 3GPP. 3GPP TS 23.401, TS 23.060, TS 23.402, TS 36.300, TS 36.304, TS 36.331, TS 25.304, and TS 25.331 may be incorporated herein by reference to know detailed descriptions on the RAN rule.

Multi-access PDN connection: This is a PDN connection in which traffic can be routed to the 3GPP access and/or the WLAN access. Each IP flow is routed only to one access at one instance.

<RAN Assistance Parameter>

Recently, apart from the policies provided by the ANDSF, mobile communication service providers are making an effort to define a policy for determining offloading to the WLAN. As part of the effort, a RAN assistance parameter has been proposed recently.

Figure 9A:
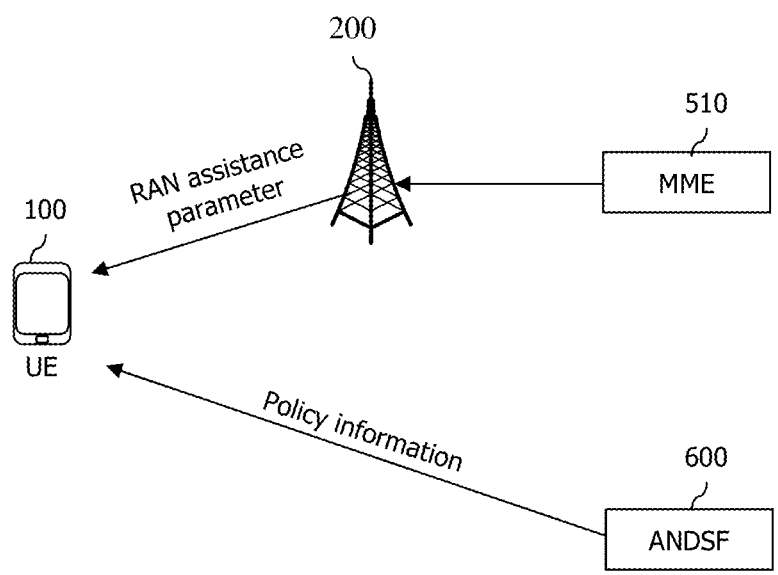
FIG. 9a illustrates an example in which a newly defined RAN assistance parameter (RAN rule) is provided to a UE in addition to an ANDSF policy.

FIG. 9a illustrates an example in which a newly defined RAN assistance parameter (RAN rule) is provided to a UE in addition to an ANDSF policy.

As shown in FIG. 9a, the ANDSF 600 may provide policy information to the UE 100, but the eNB 200 of the E-UTRAN (or UTRAN) may provide a newly defined RAN (Radio Access Network) support parameters to the UE 100.

The RAN assistance parameter may be transmitted through RRC signaling. The RAN assistance parameter may include a threshold for E-UTRAN signal strength and quality, threshold for WLAN channel utilization, threshold for WLAN back hole data transmission rate, list of WLAN identifiers, and OPI (Offload Preference Indicator).

More specifically, the RNA assistance information may include the following threshold and parameters.

3GPP access threshold
WLAN access threshold
OPI (Offload Preference Indication) value The 3GPP access threshold defines part of UTRA and/or E-UTRA radio parameter, for example, low/high RSRP (Reference Signal Received Power) threshold for the E-UTRA, and low/high CPICH (Common Pilot Channel) Ec/No threshold for the UTRA. The WLAN access threshold defines a low/high threshold for part of WLAN access parameters, for example, low/high beacon RSSI threshold, low/high UL/DL backhole data rate threshold, and low/high channel utilization threshold. The hotspot 2.0 defines the UL/DL backhole data rate. The IEEE 802.11 defines the channel utilization and beacon RSSI (Received Signal Strength Indicator).

The OPI value provided by the RAN assumes a bitmap format (namely, one-dimensional bit array) and determines when the UE moves specific traffic (for example, specific IP flow) to WLAN access or 3GPP access.

Referring to the drawing again, the UE may use the RAN assistance parameter for selection of an access network between 3GPP access and WLAN access; and traffic routing.

For the traffic routing, the MME may transmit to the UE the information about which PDN connection may be offloaded to WLAN and which PDN connection may not be offloaded to WLAN. The MME may provide the information for each PDN connection. More specifically, when a PDN connection is formed, the MME may transmit the information.

Meanwhile, in order for a service provider to allow or prevent WLAN offloading for each user or each APN, the subscriber information within an HSS (Home Subscriber Server) may include an indication about whether WLAN offloading is allowed or prevented with respect to a specific PDN.

The MME may determine whether to allow offloading to the WLAN with respect to the UE and PDN connection as described below.

The MME determines offloadability with respect to a PDN connection on the basis of subscriber information and a policy set internally.

When the UE establishes a new PDN connection, the MME may indicate whether the PDN connection may be offloaded to WLAN.

The MME may provide the UE with a update indication of WLAN offloadability with respect to a PDN connection. This operation may be started through the insert subscriber data procedure of the HSS. Also, this operation may be started through a bearer modification procedure.

When performing traffic offloading/handover between 3GPP access and WLAN access, the UE may take into account the WLAN offloadability information provided by the MME.

In case the UE receives a WLAN offloadability indication with respect to a PDN connection, the UE stores the indication while the PDN connection is maintained and performs an update when receiving a new indication.

Meanwhile, an indication about whether a PDN connection may be offloaded is transmitted from a source MME to a target MME during the mobility management procedure. This operation allows the target MME to learn from the indication previously provided to the UE and to provide an updated indication to the UE.

Figure 9B:
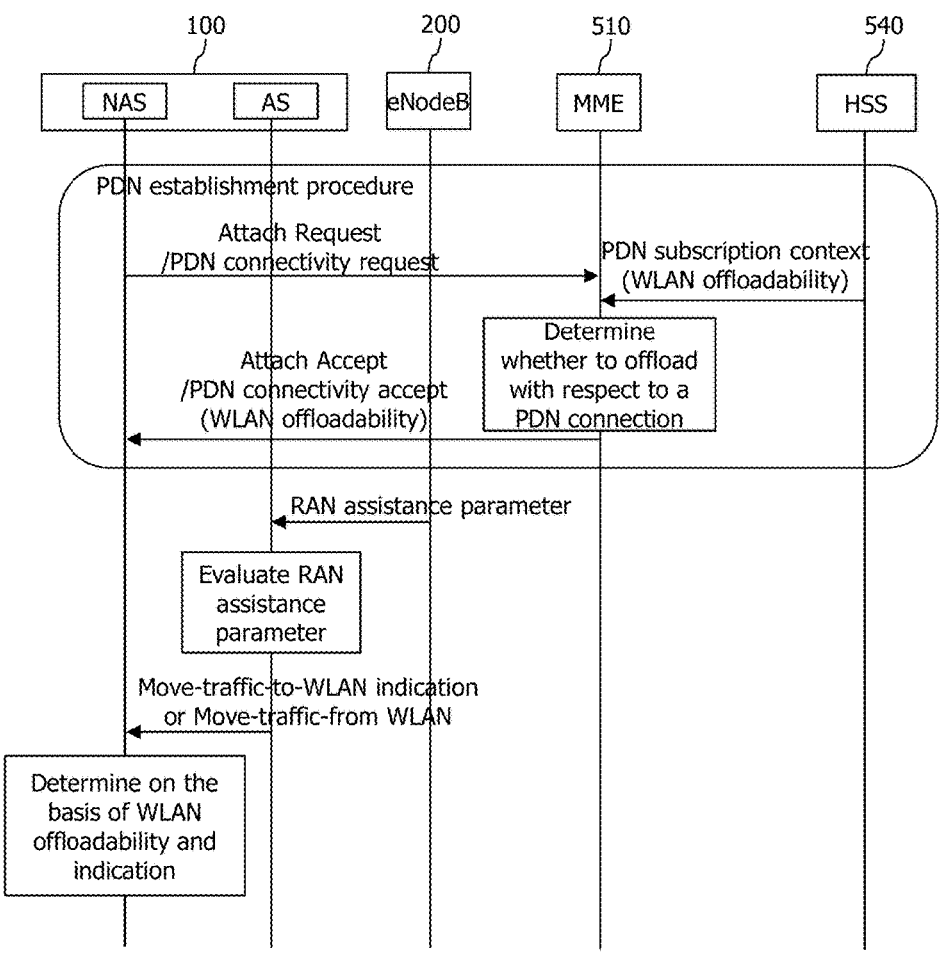
FIG. 9b illustrates a procedure for providing the RAN assistance parameter (RAN rule) shown in FIG. 9a to a UE in more detail.

FIG. 9b illustrates a procedure for providing the RAN assistance parameter (RAN rule) shown in FIG. 9a to a UE in more detail.

As may be known with reference to FIG. 9b, the HSS 540 may transmit WLAN offloadability such as shown in Table 2 to the MME 510. The WLAN offloadability may be transmitted through the PDN subscriber context shown in FIG. 9b, but transmitted to the MME during a position update procedure.

TABLE 2

| WLAN offloadability | Indicates whether the traffic associated with the APN may be offloaded to WLAN or has to be maintained for 3GPP access |
|---|---|

Then the MME 510 determines whether to offload with respect to the PDN connection on the basis of the WLAN offloadability transmitted from the HSS.

And the MME 510 may transmit WLAN offloadability indication to the UE 100 during a PDN connection procedure or modification procedure.

Meanwhile, the eNB 200 may collect information about neighboring WLAN APs and by using the information, transmit the RAN assistance parameter (RAN rule) to the AS layer (namely RRC layer) through the system information block (SIB) or RRC signaling.

The RAN assistance parameter (RAN rule) is included in the WLAN-OffloadConfig parameter (for example, wlan-OffloadConfigCommon parameter or wlan-OffloadConfigDedicated parameter) of the RRC Connection Reconfiguration message and received from the network (base station) when the UE is in the RRC connection mode. When the UE is in the RRC IDLE mode, the RAN assistance parameter (RAN rule) is included in the WLAN-OffloadConfig parameter of the system information block, for example, SIB17 and received from the network (base station).

On the other hand, the RRC Connection Reconfiguration message may include WLAN-OffloadConfig as described below.

TABLE 3

```
RRCConnectionReconfiguration-v1250-IEs ::= SEQUENCE {
    wlan-OffloadInfo-r12                      CHOICE {
        release                                   NULL,
        setup
        SEQUENCE {
            wlan-OffloadConfigDedicated-r12       WLAN-
OffloadConfig-r12,
```

Further, the system information block, for example, SIB type 17 may include WLAN-OffloadConfig as described below.

TABLE 4

```
-- ASN1START
WLAN-OffloadInfoPerPLMN-r12 ::=            SEQUENCE {
    wlan-OffloadConfigCommon-r12           WLAN-OffloadConfig-r12
    OPTIONAL,   -- Need OR
    wlan-Id-List-r12                       WLAN-Id-List-r12
    OPTIONAL,   -- Need OR
    ...
```

The WLAN-OffloadConfig may include the following information.

TABLE 5

| Description of WLAN-OffloadConfig field |
|---|
| offloadPreferenceIndicator |
| As an offload preference indicator, applied to RAN assistance WLAN interworking based on the ANDSF rule. |
| thresholdBackhaulDLBandwidth-High |
| Downlink bandwidth upperlimit threshold used by the UE for traffic adjustment to the WLAN |
| thresholdBackhaulDLBandwidth-Low |
| Downlink bandwidth upperlimit threshold used by the UE for traffic adjustment to the E-UTRAN |
| thresholdBackhaulULBandwidth-High |
| Uplink bandwidth upperlimit threshold used by the UE for traffic adjustment to the WLAN |
| thresholdBackhaulULBandwidth-Low |
| Uplink bandwidth lowerlimit threshold used by the UE for traffic adjustment to the E-UTRAN |
| thresholdBeaconRSSI-High |
| Beacon RSSI upperlimit threshold used by the UE for traffic adjustment to the WLAN |
| thresholdBeaconRSSI-Low |
| Beacon RSSI lowerlimit threshold used by the UE for traffic adjustment to the E-UTRAN |
| thresholdChannelUtilization-High |
| WLAN channel upperlimit utilization (load) used by the UE for traffic adjustment to the E-UTRAN |
| thresholdChannelUtilization-Low |
| WLAN channel lowerlimit utilization (load) used by the UE for traffic adjustment to the E-UTRAN |
| thresholdRSRP-High |
| RSRP upperlimit threshold used by the UE for traffic adjustment to the E-UTRAN |
| thresholdRSRP-Low |
| RSRP lowerlimit threshold used by the UE for traffic adjustment to the E-UTRAN |
| t-SteeringWLAN |
| Timer value indicating a time interval during the rule should be satisfied before the E-UTRAN starts traffic adjustment with the WLAN |

Referring back to a main subject, the AS layer (i.e., the RRC layer) of the UE evaluates the received RAN assistance parameters (RAN rules) to provide an indication (i.e., move-traffic-to-WLAN indication) indicating offloading to the non-3GPP access (e.g., WLAN) or an indication (i.e., move-traffic-to-WLAN indication) indicating movement to a 3GPP access (e.g., E-UTRAN/UTRAN) to the higher layer (that is, the NAS layer).

Herein, the AS layer of the UE provides an indication (i.e., move-traffic-to-WLAN indication) indicating offloading to the non-3GPP access (e.g., WLAN) to the higher layer (i.e., the NAS layer) when two following conditions are satisfied for a predetermined time (e.g., $\text{Tsteering}_{WLAN}$).

1. Condition for serving cell of 3GPP access
   $\text{RSRPmeas}<\text{Thresh}_{ServingOffloadWLAN, LowP}$; or
   $\text{RSRQmeas}<\text{Thresh}_{ServingOffloadWLAN, LowQ}$;
2. Condition for WLAN
   $\text{ChannelUtilizationWLAN}<\text{Thresh}_{ChUtilWLAN, Low}$; and
   $\text{BackhaulRateDlWLAN}>\text{Thresh}_{BackhRateDLWLAN, High}$; and
   $\text{BackhaulRateUlWLAN}>\text{Thresh}_{BackhRateULWLAN, High}$; and
   $\text{BeaconRSSI}>\text{Thresh}_{BeaconRSSIWLAN, High}$;

Meanwhile, the AS layer of the UE provides an indication (i.e., move-traffic-from WLAN indication) indicating movement to the non-3GPP access (e.g., E-UTRAN/UTRAN) to the higher layer (i.e., the NAS layer) when two following conditions are satisfied for the predetermined time (e.g., $\text{Tsteering}_{WLAN}$).

1. Condition for WLAN
   $\text{ChannelUtilizationWLAN}>\text{Thresh}_{ChUtilWLAN, High}$; or
   $\text{BackhaulRateDlWLAN}<\text{Thresh}_{BackhRateDLWLAN, Low}$; or
   $\text{BackhaulRateUlWLAN}<\text{Thresh}_{BackhRateULWLAN, Low}$; or
   $\text{BeaconRSSI}<\text{Thresh}_{BeaconRSSIWLAN, Low}$;
2. Condition for target cell of 3GPP access
   $\text{RSRPmeas}>\text{Thresh}_{ServingOffloadWLAN, HighP}$; and
   $\text{RSRQmeas}>\text{Thresh}_{ServingOffloadWLAN, HighQ}$;

Referring back to the main subject, when the indication which the NAS layer of the UE 100 receives from the AS layer is the indication (i.e., move-traffic-to WLAN indication) indicating offloading to the non-3GPP access (e.g., WLAN), the NAS layer of the UE 100 offloads only a PDN connection associated with the APN indicated by the WLAN offloadability indication to the WLAN.

<NBIFOM (Network Based IP Flow Mobility)>

Meanwhile, a technology that provides IFOM through S2a and S2b interfaces using a GTP or a PMIP which is a network based protocol is referred to as network based IP flow mobility (NBIFOM). In the NBIFOM, the UE supports the 3GPP access and the WLAN access. The NBIFOM may be classified into UE-initiated NBIFORM and network-initiated NBIFOM according to who first performs triggering.

UE-initiated NBIFOM: Mapping between IP flows and access links, which is desired by the UE may be provided to a PGW. In this case, the network may just accept or reject IP flow mobility of the UE and the network may not autonomously initiate the IP flow mobility Network-initiated NBIFOM: Mapping between the IP flows and the access links, which is desired by the network may be provided to the UE. In this case, the UE may just accept or reject the IP flow mobility by the network and the UE may not autonomously initiate the IP flow mobility.

Only when an NBIFOM capability supports both the UE and the network, the NBIFOM capability is activated. Therefore, a detection/negotiation process of the NBIFOM capability is required.

When the detection/negotiation process is described in detail, the UE transfers an NBIFOM capability indication to the network during an initial PDN connection establishment procedure. When the network also supports the NBIFOM capability, a P-GW 530 confirms supporting the NBIFOM.

A more detailed procedure will be described with reference to drawings.

Figure 10:
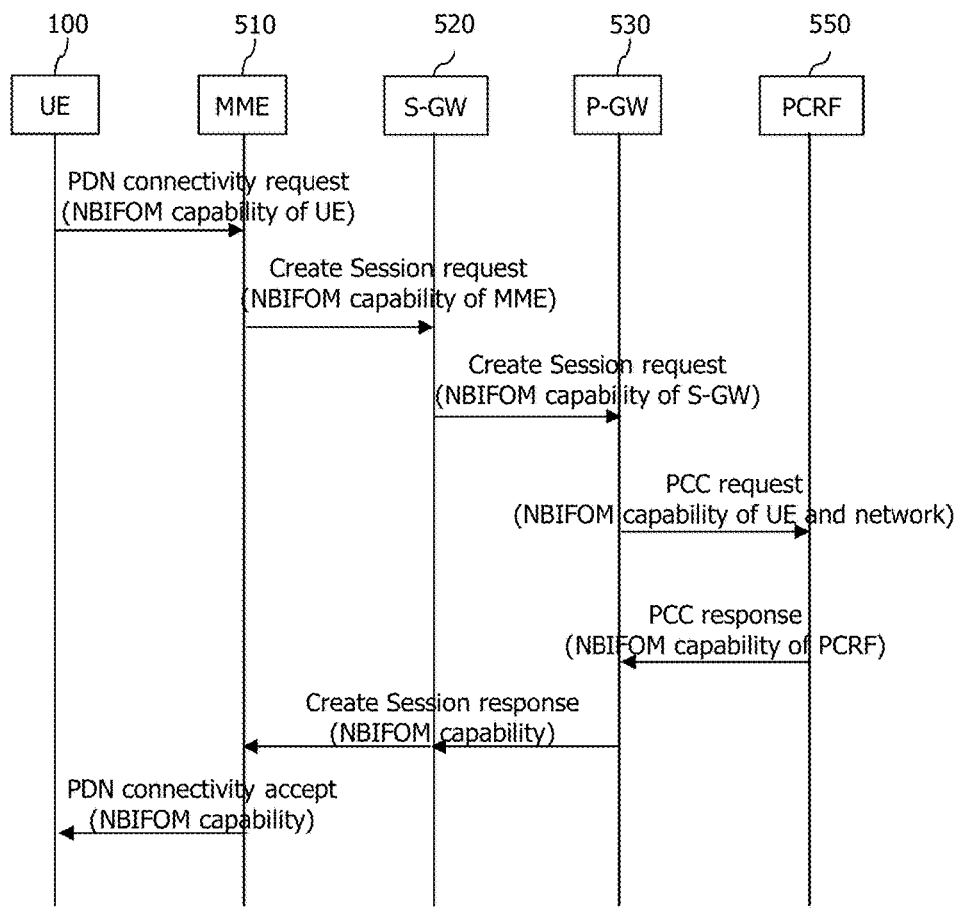
FIG. 10 illustrates an example in which an NBIFOM capability is detected/negotiated during a PDN connection establishment procedure.

FIG. 10 illustrates an example in which an NBIFOM capability is detected/negotiated during a PDN connection establishment procedure.

As known by referring to FIG. 10, the UE 100 transmits a PDN connectivity request message including the NBIFOM capability indication.

Each of the MME 510 and an S-GW 520 transmits a session generation request message including the NBIFOM capability indication thereof.

During IP-CAN session establishment, the P-GW 530 transfers a PCC request message including the NBIFOM capability indications and RAT types of the UE and the P-GW to a PCRF 600.

Then, the PCRF 600 transfers a PCC response message including the NBIFOM capability indication thereof to the P-GW 530.

Then, the P-GW 530 transfers a session generation response message including the NBIFORM capability indication to the MME 510. In addition, the MME 510 transfers a PDN connection accept message to the UE 100.

Meanwhile, when a routing rule for the NBIFOM is updated, the PCRF 600 may be transferred to the UE 100 through the P-GW 530. This is described below with reference to drawings.

Figure 11:
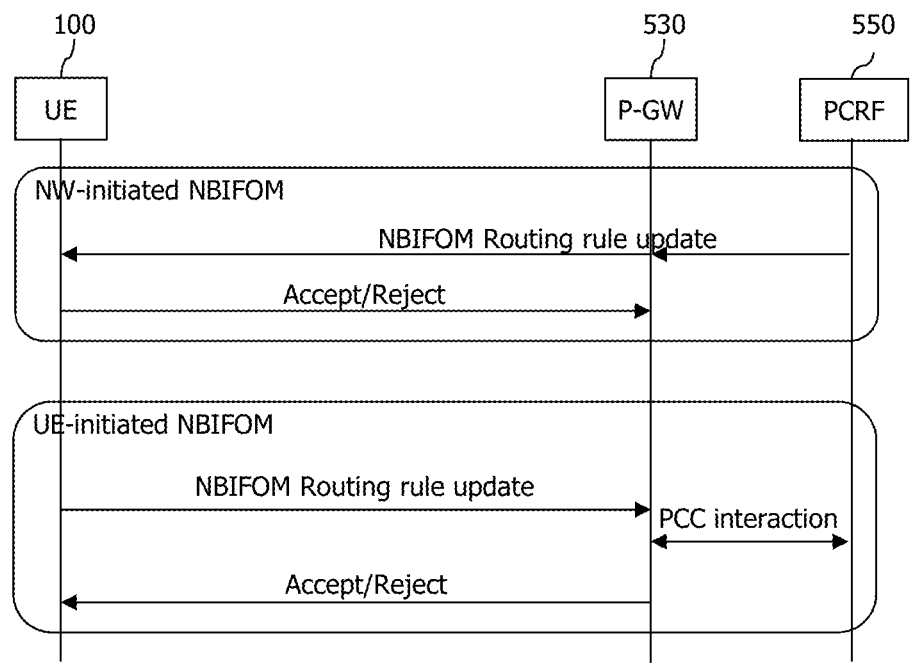
FIG. 11 illustrates a process of transferring an update of a routing rule for NBIFOM.

FIG. 11 illustrates a process of transferring an update of a routing rule for NBIFOM.

As known by referring to FIG. 11, transferring the updated routing rule may vary depending on whether the network initiates the NBIFOM or the UE initiates the NBIFOM.

First, in the case of the NBIFOM initiated by the network, the PCRF 600 may trigger the update of the routing rule for the NBIFOM and the updated routing rule may be transferred to the P-GW 530 during a session modification procedure.

The P-GW 530 transfers the routing rule to the UE 100 through the S-GW 520 and the MME 510. In detail, when the P-GW 530 receives a policy regarding the update of the routing rule from the PCRF 600 and the corresponding PDN connection is routed to both the 3GPP access and the WLAN access, the P-GW 530 may transfer the routing rule on the 3GPP access and the WLAN access.

In this case, the UE 100 may accept/reject the updated routing rule. Therefore, the P-GW 530 may not adopt the updated routing rule before the UE 100 confirms the updated routing rule.

Meanwhile, in the case of the NBIFOM initiated by the UE, the UE 100 transfers the updated routing rule to the P-GW 530. In detail, when the corresponding PDN connection is routed to both the 3GPP access and the WLAN access, the UE 100 may transfer the routing rule on the 3GPP access and the WLAN access.

<Problem Scenario Presented in Present Invention>

In the example of FIG. 9b above, it is assumed that the MME 510 decides that the offloading is impossible with respect to, for example, PDN connection #1 and transfers to the UE 100 the indication (PDN connection #1: WLAN offloadability=No) indicating that it is impossible to offload PDN connection #1 to the WLAN. However, in the example of FIG. 10, while the NBIFOM capability is detected/negotiated, the PDN connection #1 is decided to move by the unit of the IP flow, and as a result, a mutual confliction may occur. This will be described in more detail with reference to FIG. 12.

Figure 12:
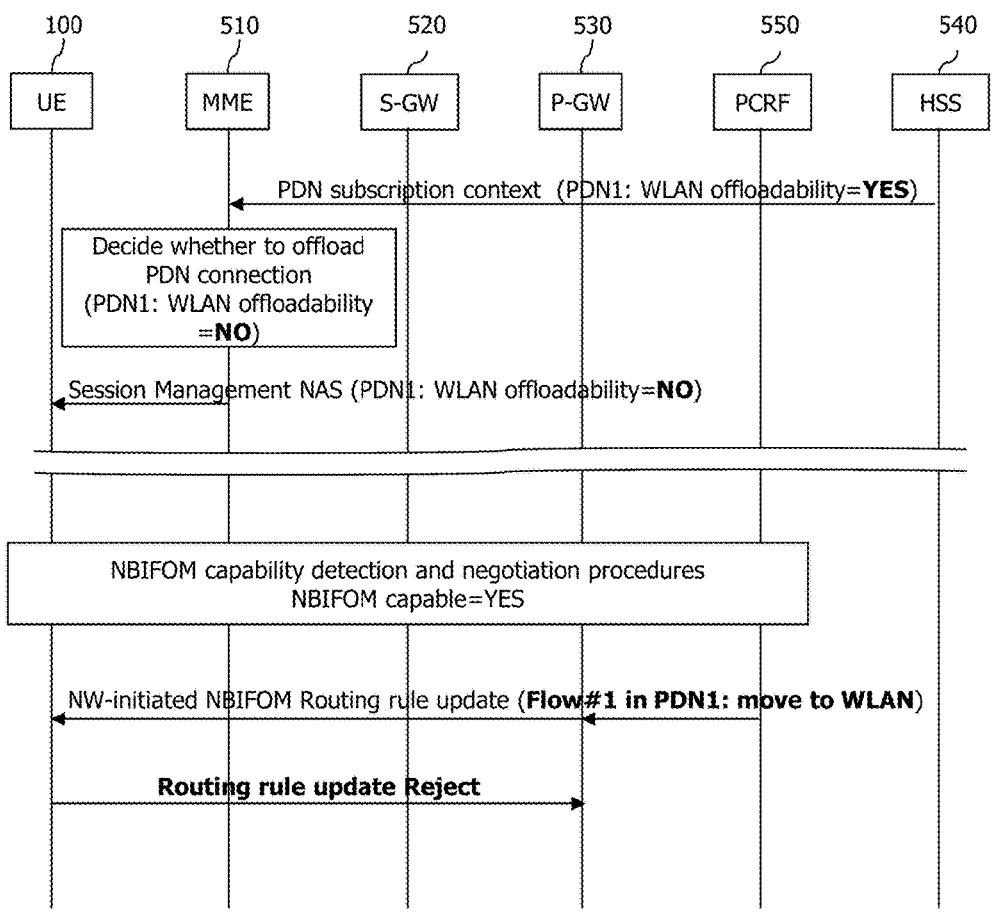
FIG. 12 illustrates one example in which indications for WLAN offloadability conflict with each other.

FIG. 12 illustrates one example in which indications for WLAN offloadability conflict with each other.

Referring to FIG. 12, the MME 510 receives the subscriber information through the PDN subscriber context from the HSS. The subscriber information includes the WLAN offloadability indication used in an interworking solution using the RAN assistance parameter (RAN rule).

Then, the MME 510 determines whether to offload the PDN connection identified by PDN connection #1 to the WLAN based on the WLAN offloadability indication. In this case, according to the WLAN offloadability indication, even though it may be possible to offload the PDN connection identified by the PDN connection #1, if the UE is roaming, the MME 510 may determine that the PDN connection identified by the PDN connection #1 is not offloaded to the WLAN according to a policy for the roaming.

Then, the MME 510 transfers the indication PDN connection #1 (WLAN offloadability=No) indicating that the PDN connection identified by the PDN connection #1 is not offloaded to the WLAN to the UE 100 during the PDN establishment or modification procedure.

Meanwhile, the NBIFOM capability detection/negotiation process is performed during the PDN connection configuring/modifying procedure and whether the corresponding PDN connection #1 may move by the unit of an IP flow through the NBIFOM is negotiated by considering the NBIFOM capabilities of the UE and network nodes. In FIG. 12, a result that the PDN connection #1 is capable of moving by the unit of the IP flow is transferred to the UE.

Therefore, the P-GW 530 may request the UE to add/update the routing rule for the IP flow mobility for the corresponding PDN by triggering the PCRF, and the like.

Then, a situation occurs, in which the UE 100 needs to perform the IP flow mobility with respect to the PDN connection #1 that receives the indication that the offloading to the WLAN is impossible.

That is, different policies conflict with each other in the UE 100 and there is a possibility that the UE 100 will reject the routing rule update request from the network.

When multiple UEs face such a situation, unnecessary signaling is transmitted/received in an entire system, and as a result, resources are wasted and utilization of network resources deteriorates.

Figure 13:
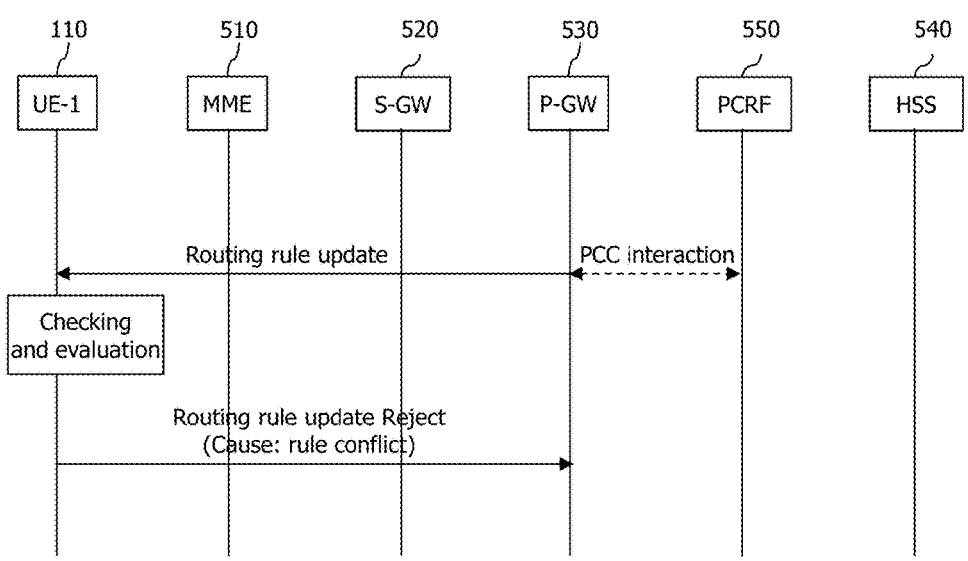
FIG. 13 is an exemplary diagram illustrating the existing attempt for solving a problem illustrated in FIG. 12.

FIG. 13 is an exemplary diagram illustrating the existing attempt for solving a problem illustrated in FIG. 12.

Referring to FIG. 13, according to the existing attempt to solve the problem illustrated in FIG. 12, the UE 100 checks and evaluates a request for updating a routing rule initiated by the network and when it is determined that there is a conflict, the UE 100 may transmit a routing rule update reject message including an indication announcing the confliction of the rule.

Such an attempt is applied to the PDN connection establishment procedure illustrated in FIG. 12 and is described as follows. When a capability negotiation of the NBIFOM is performed during the PDN connection establishment procedure and thus the PDN connection for the NBIFOM is established, the UE 100 may receive the indication for the WLAN offloadability. In this case, when there is indication information indicating that it is impossible to offload the corresponding PDN connection to the WLAN, even though the UE 100 receives a routing rule update request for causing the conflict of the rule from the network (i.e., a rule that causes offloading of a specific IP flow of the corresponding PDN to the WLAN), the UE 100 may transmit the routing rule update reject message including the indication (e.g., the value of the cause field) indicating the conflict of the rule.

Meanwhile, in the case of updating the routing rule initiated by the UE 100, even if the UE 100 does not generate the routing rule causing the rule conflict according to determination thereof or even if the routing rule causing the conflict is generated, it is possible not to request the routing rule to the network by autonomously dropping the routing rule.

However, the existing problems ma not completely be solved even by such an attempt. In this regard, a case where the P-GW/PCRF may request the update of the routing rule even though the P-GW/PCRF receives the indication of the rule conflict from the UE and a case where the P-GW/PCRF may not request the update of the routing rule afterward after receiving the indication indicating the conflict of the rule from the UE are separately described. First, in a first case, the UE 100 transmits an update reject message of the routing rule including the indication indicating the conflict of the rule to the P-GW/PCRF, but the P-GW/PCRF may continuously attempt to update the routing rule and the UE 100 repeatedly reject the update of the routing rule, and as a result, network resources may be wasted. In a second case, even if the MME sends a changed indication for WLAN offloadability to the UE 100 (i.e., even if the MME transmits an indication that a change to the offloading of the corresponding PDN connection to the WLAN to the UE), since the P-GW/PCRF does not know the fact, the P-GW/PCRF may not attempt to update the routing rule by recognizing that there is still the conflict of the rule.

Due to such a reason, the problems may not be solved even by the existing attempt.

<Disclosure of Present Invention>

Accordingly, the disclosure of the present invention provides a method for the UE to flexibly suspend or resume the NBIFOM capability for the corresponding PDN connection depending on the indication of the WLAN offloadability.

Specifically, according to a first description of the disclosure of the present invention, the UE may receive indication information regarding the WLAN offloadability and thereafter, determine whether to suspend or resume the NBIFOM capability and notify or request the network to suspend or resume the NBIFOM capability according to the determination.

In addition, according to a second description of the disclosure of the present invention, the MME may determine the offloadability of the PDN connection and thereafter, transmit an indication for the determined offloadability even to other network nodes (e.g., P-GW, S-GW, PCRF, etc.) as well as the UE. Is improved that the MME transfers the indication of the determined offloadability only to the UE via the NAS message (for example, PDN connectivity accept).

Meanwhile, according to a third description of the disclosure of the present invention, the MME may determine whether there is the conflict with the NBIFOM in the process of deciding whether to offload the PDN connection, decide the suspend of the NBIFOM when there is the conflict, and decide resuming the NBIFOM when the confliction is resolved.

Hereinafter, each description of the disclosure of the present invention will be handled in detail.

I. First Description of Disclosure of Present Invention

When the UE obtains the indication information regarding the WLAN offloadability, the UE may determine whether to offload the corresponding PDN connection to the WLAN. Further, the UE may know whether the corresponding PDN connection is configured as the NBIFOM according to the result of the NBIFOM negotiation. Based on the information, if the corresponding PDN connection is configured as the NBIFOM, but it is impossible to offload the corresponding PDN connection to the WLAN, the UE transmits information or a message for announcing/requesting the suspension of the NBIFOM to the network (e.g. P-GW/PCRF).

Meanwhile, the UE may receive the WLAN offloadability indication modified with respect to the corresponding PDN connection. For example, when subscriber information is changed and the WLAN offloadability indication is changed from NO to YES, when the MME changes the WLAN offloadability indication from NO to YES according to the changed policy, or when the UE changes the RAT (e.g., a change between the E-UTRAN and the UTRAN), the WLAN offloadability indication in the current RAT may be changed from NO to YES. Thus, when the WLAN offloadability indication is changed from NO to YES, the UE may determine that the conflict of the rule is resolved and may decide to resume the NBIFOM capability. Then, the UE may transmit information or a message for announcing/requesting resumption of the NBIFOM to the network (e.g., P-GW/PCRF).

The information announcing/requesting the aforementioned suspension or resumption may be transmitted while being included in the NAS message, the message of the WLCP protocol message, the message of the GTP protocol message, and the like. Alternatively, the information may be transmitted while being included in an NBIFOM related message created to transfer indications of NBIFOM capability exchange/negotiation or routing rule information exchange, and access loss. Alternatively, the information may be transmitted while being included in a newly defined message. Alternatively, a new message may be newly defined to announce/request the suspension or resumption and the message may be transmitted. Moreover, the message may be transferred via other network nodes including MME, S-GW, SGSN, TWAN, ePDG, and the like and the protocol of the corresponding interface.

Additionally, even if the UE does not receive the WLAN offloadability indication modified with respect to the corresponding PDN connection, the UE may request/indicate the suspension and resumption of the NBIFOM with respect to the corresponding PDN connection based on previously received and stored information. For example, the indication for the WLAN offloadability is transferred to the UE for each access network and in this case, when the indications for the WLAN offloadability are different every network (e.g., when the WLAN offloadability indication to the E-UTRAN is NO and the WLAN offloadability indication to the UTRAN is YES), the UE may store the indications and request the suspension of the NBIFOM in E-UTRAN connection, and request resumption of the NBIFOM while connecting to the U-TRAN.

Meanwhile, the information/message announcing/requesting the suspension or resumption of the NBIFOM transmitted to the network by the UE ma be information/message directly requested to (temporarily) activate/deactivate the NBIFOM capability for the corresponding PDN. Alternatively, the information/message may be an implicit information/message for inducing the network to (temporarily) activate/deactivate the NBIFOM capability. When an example in which the implicit information is transferred is described, the UE may just transfer the indication for the WLAN offloadability to the network, and as a result, the network may indirectly determine that the capability of the NBIFOM is possible/impossible.

The first description of the disclosure of the present invention will be described with reference to FIGS. 14 and 15.

Figure 14A:
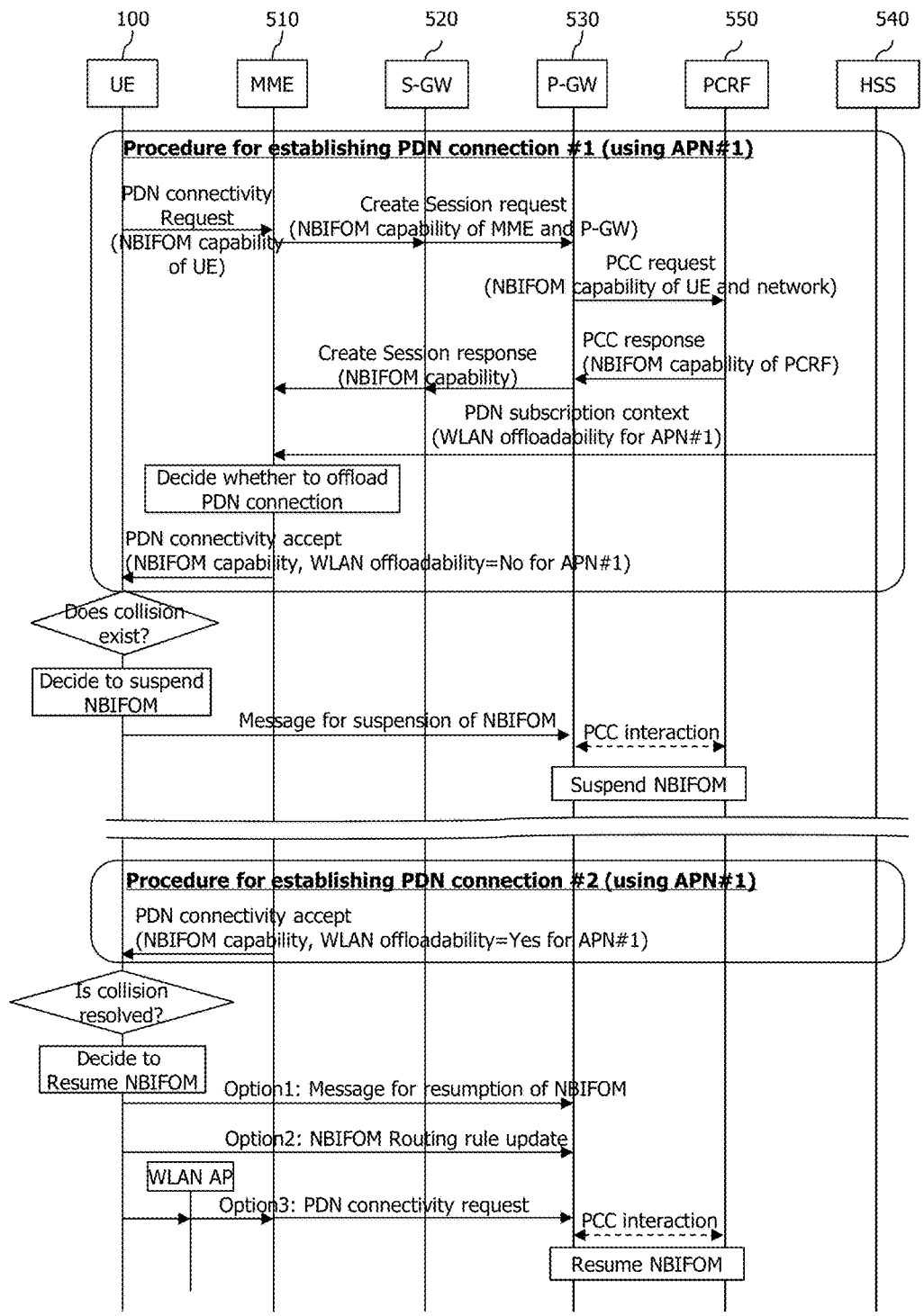
FIG. 14a is a signal flowchart exemplarily illustrating a first description of a disclosure of the present invention.
Figure 14B:
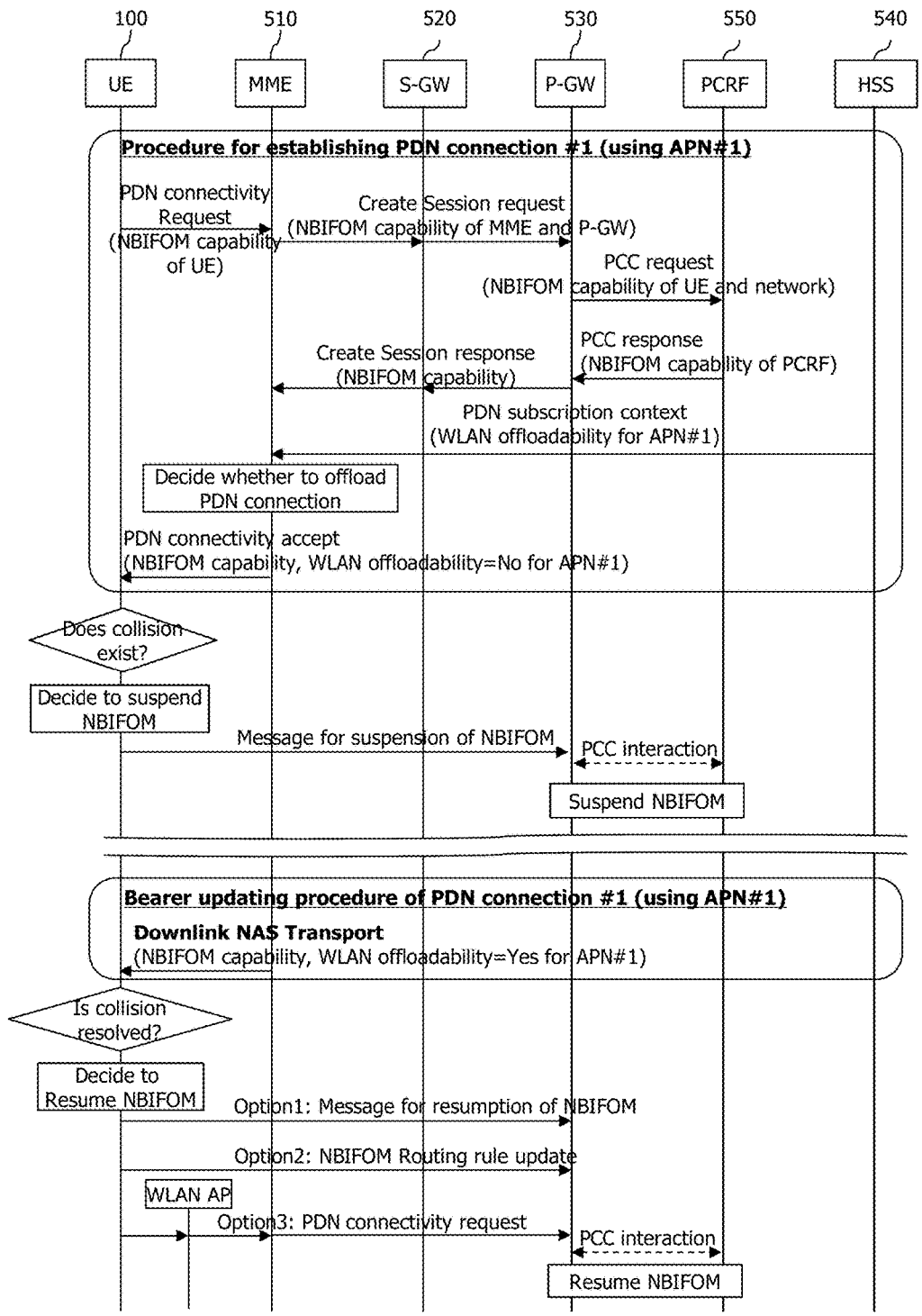

FIG. 14a is a signal flowchart exemplarily illustrating a first description of a disclosure of the present invention. FIG. 14b is a signal flowchart exemplarily illustrating a modified example of the first description illustrated in FIG. 14a.

Referring to FIGS. 14a and 14b, the NAS layer of the UE 100 singly transmits a PDN connectivity request message to generate PDN connection #1 using the APN #1 or transmits an Attach Request message including the PDN connectivity request message to the MME 510. The PDN connectivity request message includes an indication (e.g., NBIFOM capability) regarding whether the UE 100 assists the NBIFOM capability thereof.

When the MME 510 receives the PDN connectivity request message, the MME 510 transmits a session create request (e.g., create session request) message to the S-GW 520. The create session request message includes an indication (e.g., NBIFOM capability) regarding whether the MME 510 supports the NBIFOM capability thereof. The S-GW 520 transfers the create session request message to the P-GW 530. In this case, the create session request message includes an indication (e.g., NBIFOM capability) regarding whether to assist the NBIFOM capability of the S-GW 520.

While the P-GW 530 establishes an IP-CAN session, the P-GW 530 transfers a PCC request message including the NBIFOM capability indications and RAT types of the UE and the P-GW to the PCRF 600.

Then, the PCRF 600 transfers a PCC response message including the NBIFOM capability indication thereof to the P-GW 530.

Then, the P-GW 530 transfers a session creation response (e.g., create session response) message including the NBIFORM capability indication to the S-GW 520. The S-GW 520 transfers the create session response message to the MME 510.

In response to the PDN connectivity creation request procedure, the MME 510 performs an interaction with the HSS 540 and receives subscriber information from the HSS 540 through a PDN subscriber context. The subscriber information includes the WLAN offloadability indication used in an interworking solution using the RAN assistance parameter (RAN rule).

The MME 510 decides whether to offload the PDN connection #1 using APN #1 to the WLAN based on the WLAN offloadability indication obtained from the HSS 540.

In addition, the MME 510 transfers a PDN connectivity accept (e.g., PDN connectivity accept) message including the WLAN offloadability indication and the NBIFOM capability indication to the UE 100 according to the decision. Herein, in the example of FIG. 14, the WLAN offloadability indication included in the PDN connectivity accept message indicates that the PDN connection #1 using the APN #1 is not offloaded to the WLAN (WLAN offloadability=No for APN #1).

The UE 100 checks each of the WLAN offloadability indication and the NBIFOM capability indication included in the PDN connectivity accept message and determines whether there is the conflict between the WLAN offloadability indication and the NBIFOM capability indication. When it is determined that there is the conflict, the UE 100 decides to temporarily suspend the NBIFOM.

When the UE 100 decides to temporarily suspend the NBIFOM, the UE 100 transmits information or a message for announcing/requesting the suspension of the NBIFOM to the P-GW 530 (for example, a message for suspension of NBIFOM). Accordingly, the update of the network-initiated NBIFOM routing rule by the PCRF 550/P-GW 530 (i.e., update of the routing rule causing the collision again) may not be performed. In addition, the update (i.e., updating of the routing rule causing the collision again) of the routing rule initiated by the UE 100 may not be performed.

Meanwhile, the NAS layer of the UE 100 performs the PDN connectivity request procedure in order to establish PDN connection #2 using APN #1. During the PDN connectivity request procedure, the NAS layer of the UE 100 receives the PDN connectivity accept message for the PDN connection #2 using the APN #1. Herein, the PDN connectivity accept message includes the NBIFOM capability indication and an indication (e.g., WLAN offloadability=Yes for APN #1) indicating that the APN #1 is changed to be offloaded to the WLAN.

The UE 100 checks each of the WLAN offloadability indication and the NBIFOM capability indication included in the PDN connectivity accept message and determines whether there is the conflict between the WLAN offloadability indication and the NBIFOM capability indication. When it is determined that the collision is resolved, the UE 100 determines whether to resume the NBIFOM. Meanwhile, as illustrated in FIG. 14*b*, a bearer update procedure of the PDN connection #1 using the APN #1 may be performed in the network and in this case, the MME may make include the indication (e.g., WLAN offloadability=Yes for APN #1) indicating that the APN #1 is changed to be offloaded to the WLAN be included in the message transferred to the UE 100. The UE 100 checks each of the WLAN offloadability indication and the NBIFOM capability indication included in the PDN connectivity accept message and determines whether there is the conflict between the WLAN offloadability indication and the NBIFOM capability indication. When it is determined that the collision is resolved, the UE 100 determines whether to resume the NBIFOM. A detailed process for the decision of the resumption will be described below with reference to FIG. 15.

When the UE decides to resume the NBIFOM, the UE 100 may announce the resumption of the NBIFOM to the P-GW 530 through one of several options illustrated in FIGS. 14*a* and 14*b*.

According to option 1 illustrated, the UE 100 transmits information or a message (e.g., message for resumption of NBIFOM) for announcing/requesting the resumption of the NBIFOM to the P-GW 530.

Alternatively, the UE 100 may announce the resumption of the NBIFOM to the P-GW 530 in the implicit method.

For example, like option 2 illustrated, the UE 100 may announce the resumption of the NBIFOM to the P-GW 530 by requesting the update of the NBIFOM routing rule. That is, the UE 100 may implicitly announce the resumption of the NBIFOM by requesting the P-GW 530 to update the NBIFOM routing rule to offload the specific IP flow of the PDN connection #1 to the WLAN.

As another example, like option 3 illustrated, the UE 100 may implicitly announce the resumption of the NBIFOM by transmitting the PDN connectivity create request message via a WLAN access network (i.e., WLAN AP).

According to options 2 and 3 illustrated, the P-GW 530 may know that the collision is resolved, and as a result, the resumption of the NBIFOM is requested.

Figure 15:
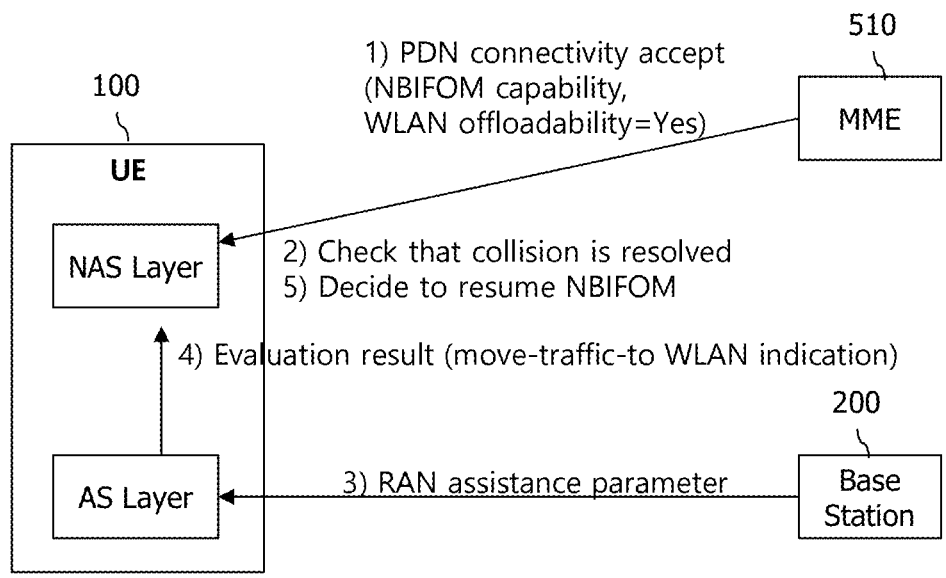
FIG. 15 is an exemplary diagram specifically illustrating an NBIFOM resumption deciding process of a UE illustrated in FIG. 14.

FIG. 15 is an exemplary diagram specifically illustrating an NBIFOM resumption deciding process of UE illustrated in FIG. 14.

Referring to FIG. 15, the NAS layer of the UE 100 receives the PDN connectivity accept message for PDN connection using the APN #1. Herein, the PDN connectivity accept message includes the NBIFOM capability indication and the indication (e.g., WLAN offloadability=Yes for APN #1) indicating that the APN #1 is changed to be offloaded to the WLAN.

The UE 100 checks each of the WLAN offloadability indication and the NBIFOM capability indication included in the PDN connectivity accept message and determines whether the conflict between the WLAN offloadability indication and the NBIFOM capability indication is resolved.

On the other hand, the base station 200 collects relevant information about neighboring WLAN APs and accordingly transmits the RAN assistance parameters (RAN rules) to the AS layer (i.e., the RRC layer) of the UE 100 via the system information block (SIB) or through the RRC signal.

The AS layer (i.e., the RRC layer) of the UE evaluates the received RAN assistance parameters (RAN rules) to provide an indication (i.e., move-traffic-to-WLAN indication) indicating offloading to the non-3GPP access (e.g., WLAN) or an indication (i.e., move-traffic-to-WLAN indication) indicating movement to a 3GPP access (e.g., E-UTRAN/UTRAN) to the higher layer (that is, the NAS layer).

Herein, the AS layer of the UE provides an indication (i.e., move-traffic-to-WLAN indication) indicating offloading to the non-3GPP access (e.g., WLAN) to the higher layer (i.e., the NAS layer) when two following conditions described by referring to FIG. 9*b* are satisfied for a predetermined time (e.g., $\text{Tsteering}_{WLAN}$).

The NAS layer of the UE 100 decides whether to resume the NBIFOM based on whether the collision is resolved and the indication received from the AS layer.

Herein, when the collision is resolved and the indication is an indication (i.e., move-traffic-to-WLAN indication) indicating offloading to the non-3GPP access (e.g., WLAN), the NAS layer of the UE 100 decides to resume the NBIFOM.

II. Second Description of Disclosure of Present Invention

As described above in brief, according to a second description of the disclosure of the present invention, the MME 510 may decide the offloadability of the PDN connection during the PDN connection establishment procedure and thereafter, transmit an indication for the decided offloadability even to other network nodes (e.g., P-GW, S-GW, PCRF, etc.) as well as the UE. Is improved that the MME 510 transfers the indication of the determined offloadability only to the UE via the NAS message (for example, PDN connectivity accept).

When the indication transferred to the network node (e.g., P-GW, S-GW, PCRF, etc.) is an indication (e.g., WLAN offloadability=No for APN #1) indicating that it is impossible to offload the APN #1 to the WLAN, the indication may lead to suspension or temporary deactivation of the NBIFOM capability.

On the contrary, when the indication transferred to the network node (e.g., P-GW, S-GW, PCRF, etc.) is an indication (e.g., WLAN offloadability=Yes for APN #1) indicating that the APN #1 is changed to be offloaded to the WLAN, the indication may lead to suspension or activation of the NBIFOM capability.

The second description of the disclosure of the present invention will be described with reference to FIG. 16.

Figure 16:
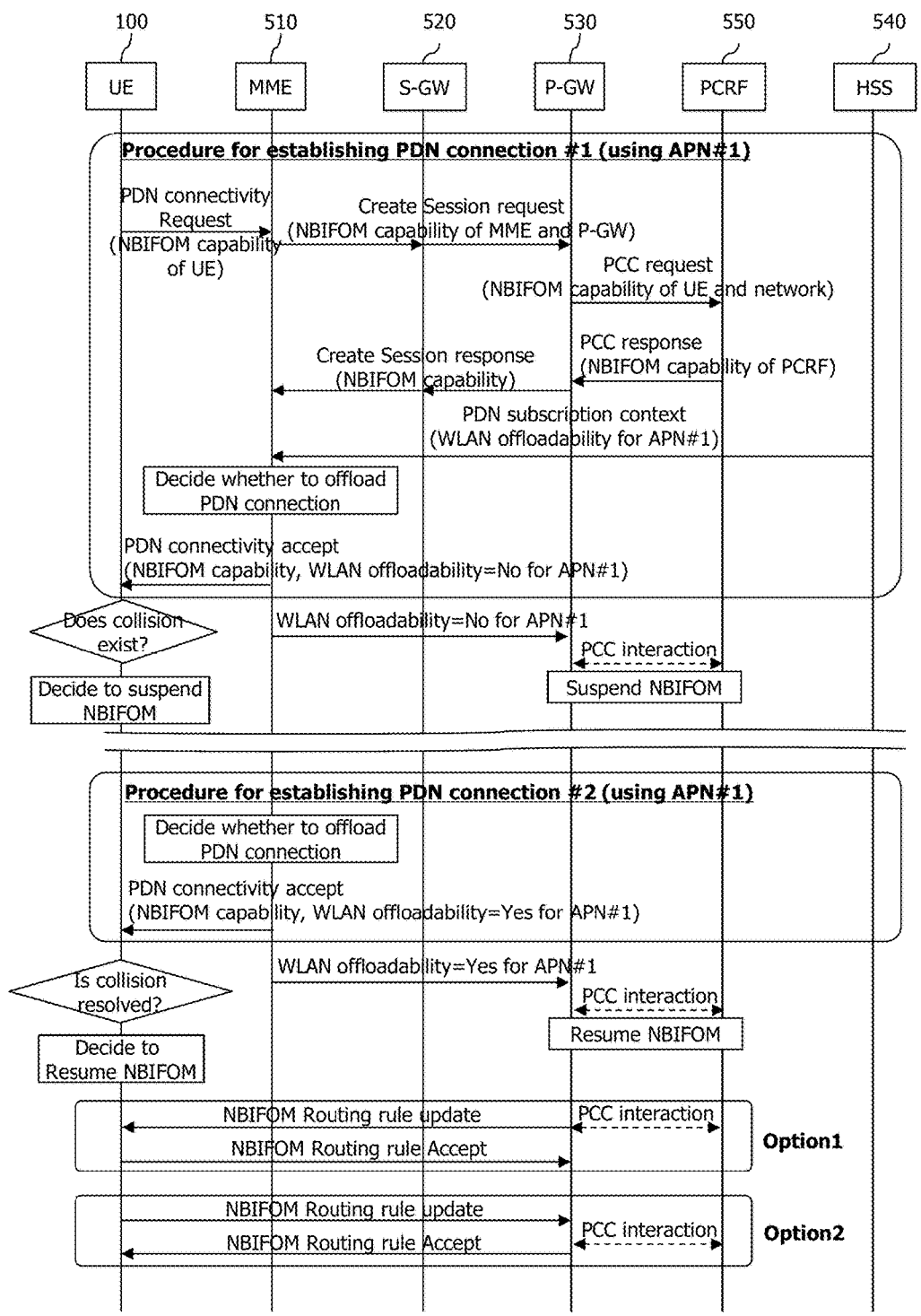
FIG. 16 is a signal flowchart exemplarily illustrating a second description of the disclosure of the present invention.

FIG. 16 is a signal flowchart exemplarily illustrating a second description of the disclosure of the present invention.

The same procedures as those in FIG. 14 among procedures illustrated in FIG. 16 are not duplicatively described and the description of FIG. 14 will be applied as it is. Hereinafter, a procedure different from the procedure of FIG. 14 will be mainly described.

The NAS layer of the UE 100 performs the PDN connectivity request procedure in order to establish the PDN connection #1 using the APN #1. During the PDN connectivity request procedure, the MME 510 decides not to offload the PDN connection #1 using the APN #1 to the WLAN based on the WLAN offloadability indication obtained from the HSS 540 and thereafter, transfers the PDN connectivity accept (e.g., PDN connectivity accept) message including the indication (e.g., PDN connectivity accept) message including the indication (WLAN offloadability=No for APN #1) indicating that the PDN connection #1 using the APN #1 is not offloaded to the WLAN to the UE 100.

Subsequently, the MME 510 transfers the indication even to the P-GW 530. The P-GW 530 decides to suspend the NBIFOM based on the indication while performing the PCC interaction with the PCRF 550. Accordingly, the update of the network-initiated NBIFOM routing rule by the PCRF 550/P-GW 530 (i.e., update of the routing rule causing the collision again) may not be performed.

Moreover, the UE 100 checks each of the WLAN offloadability indication and the NBIFOM capability indication included in the PDN connectivity accept message and determines whether the conflict between the WLAN offloadability indication and the NBIFOM capability indication and when there is the conflict between the WLAN offloadability indication and the NBIFOM capability indication, the UE 100 decides to suspend the NBIFOM. As a result, the update (i.e., updating of the routing rule causing the collision again) of the routing rule initiated by the UE 100 may not be performed.

Meanwhile, the NAS layer of the UE 100 performs the PDN connectivity request procedure in order to establish the PDN connection #2 using the APN #1. As a result, during the PDN connectivity request procedure, the MME 510 decides to offload the PDN connection #2 using the APN #1 to the WLAN based on the WLAN offloadability indication obtained from the HSS 540 and thereafter, transfers the PDN connectivity accept (e.g., PDN connectivity accept) message including the indication (e.g., PDN connectivity accept) message including the indication (WLAN offloadability=No for APN #1) indicating that the PDN connection #1 using the APN #1 is not offloaded to the WLAN to the UE 100.

Subsequently, the MME 510 transfers the indication even to the P-GW 530. The P-GW 530 decides to resume the NBIFOM based on the indication while performing the PCC interaction with the PCRF 550. Accordingly, the update of the network initiated NBIFOM routing rule by the PCRF 550/P-GW 530 may be performed like Option 1 illustrated.

Moreover, the UE 100 checks each of the WLAN offloadability indication and the NBIFOM capability indication included in the PDN connectivity accept message and determines whether the conflict between the WLAN offloadability indication and the NBIFOM capability indication and when the conflict between the WLAN offloadability indication and the NBIFOM capability indication is resolved, the UE 100 decides to resume the NBIFOM. As a result, the update of the routing rule initiated by the UE 100 may be performed like option 2 illustrated.

III. Third Description of Disclosure of Present Invention

As described above in brief, according to a third description of the disclosure of the present invention, the MME may determine whether there is the conflict with the NBIFOM in the process of deciding whether to offload the PDN connection, decide the suspend of the NBIFOM when there is the conflict, and decide resuming the NBIFOM when the confliction is resolved.

The third description of the disclosure of the present invention will be described with reference to FIG. 17.

FIG. 14a is a signal flowchart exemplarily illustrating a third description of the disclosure of the present invention.

Figure 17:
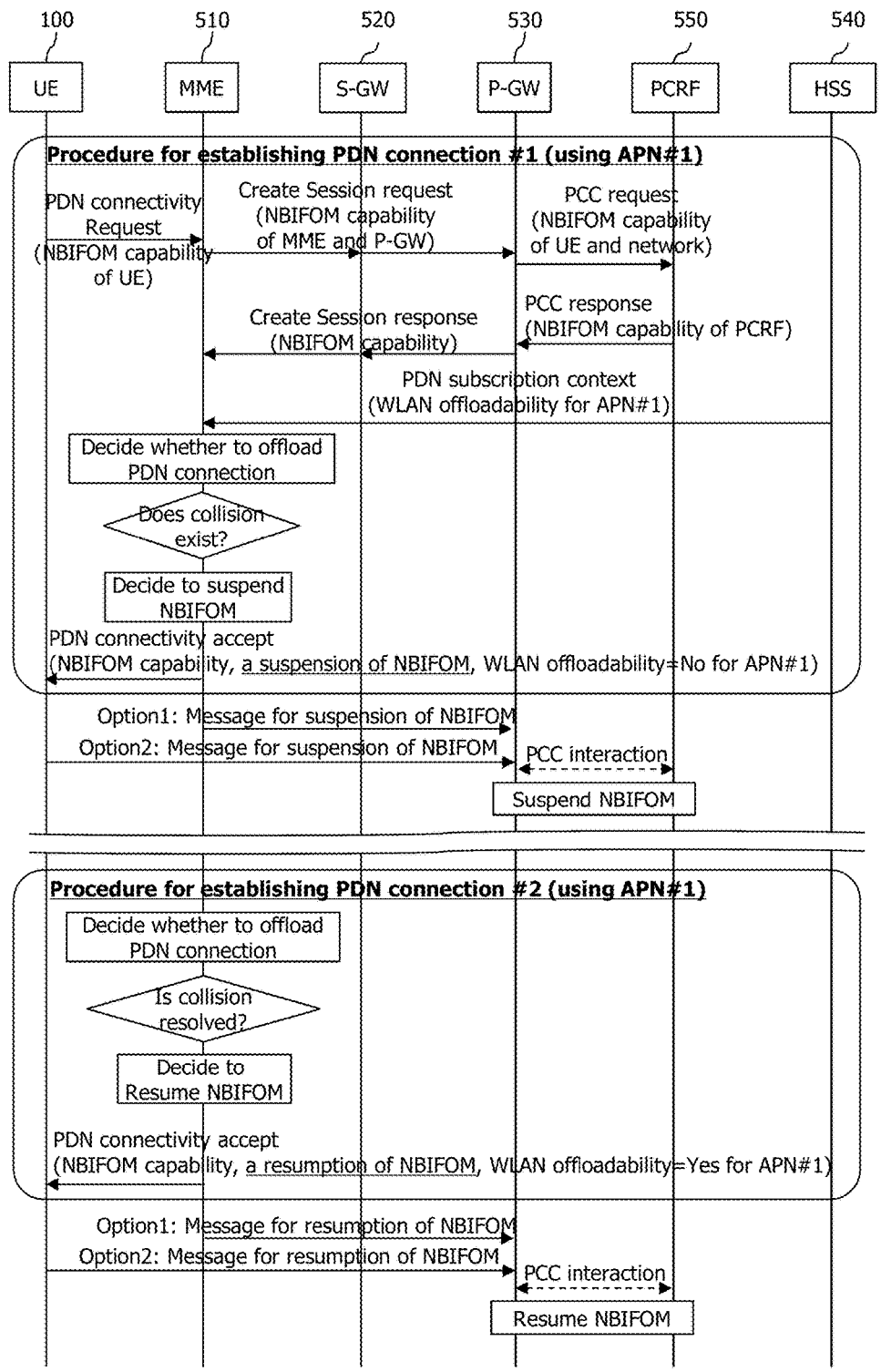
FIG. 17 is a signal flowchart exemplarily illustrating a third description of the disclosure of the present invention.

The same procedures as those in FIG. 14 among procedures illustrated in FIG. 17 are not duplicatively described and the descriptions of FIGS. 14 and 16 will be applied as they are. Hereinafter, a procedure different from the procedures of FIGS. 14 and 16 will be mainly described.

The NAS layer of the UE 100 performs the PDN connectivity request procedure in order to establish the PDN connection #1 using the APN #1.

During the PDN connectivity request procedure, the MME 510 decides not to offload the PDN connection #1 using the APN #1 to the WLAN based on the WLAN offloadability indication obtained from the HSS 540.

In addition, the MME 510 checks whether the decision conflicts with the NBIFOM. When the MME 510 determines that there is the conflict, the MME 510 decides to suspend the NBIFOM.

Then, the MME 510 transfers the PDN connectivity accept (e.g., PDN connectivity accept) message including the indication (WLAN offloadability=No for APN#1) indicating that the PDN connection #1 using the PAN #1 is not offloaded to the WLAN and information representing the suspension of the NBIFOM to the UE 100.

Subsequently, according to option 1 illustrated, the UE 510 transmits information or a message (e.g., message for suspension of NBIFOM) for announcing/requesting the suspension of the NBIFOM to the P-GW 530. Alternatively, according to option 2 illustrated, the UE 100 transmits information or a message (e.g., message for suspension of NBIFOM) for announcing/requesting the suspension of the NBIFOM to the P-GW 530. As a result, the PCRF 550/P-GW 530 may suspend the NBIFOM through the PPC interaction, accordingly, the update (i.e., update of the routing rule causing the collision again) of the network-initiated NBIFOM routing rule may not be performed.

Meanwhile, the NAS layer of the UE 100 performs the PDN connectivity request procedure in order to establish the PDN connection #2 using the APN #1.

As a result, the MME 510 decides to offload the PDN connection #1 using the APN #1 to the WLAN based on the WLAN offloadability indication obtained from the HSS 540.

In addition, the MME 510 checks whether the decision conflicts with the NBIFOM. When the MME 510 determines that there is the conflict, the MME 510 decides to resume the NBIFOM.

Then, the MME 510 transfers the PDN connectivity accept (e.g., PDN connectivity accept) message including the indication (WLAN offloadability=Yes for APN#1) indicating that the PDN connection #2 using the PAN #1 is offloaded to the WLAN and information representing the resumption of the NBIFOM to the UE 100.

Subsequently, according to option 1 illustrated, the MME 510 transmits information or a message (e.g., message for resumption of NBIFOM) for announcing/requesting the resumption of the NBIFOM to the P-GW 530. Alternatively, according to option 2 illustrated, the UE 100 may announce the resumption of the NBIFOM to the P-GW 530. For example, the UE 100 may transmit the message (e.g., message for resumption of NBIFOM) for announcing the resumption of the NBIFOM to the P-GW 530. Alternatively, the UE 100 may indirectly announce the resumption of the NBIFOM by transmitting the update request of the routing rule initiated by the UE to the P-GW 530.

IV. Supplementary Description of Disclosure of Present Invention

IV-1. Description of Detailed Operation of P-GW/PCRF

It is described that when the P-GW 530/PCRF 550 receives the information/message announcing/requesting the suspension of the NBIFOM, the P-GW 530/PCRF 550 suspends or temporarily deactivates the NBIFOM and when the P-GW 530/PCRF 550 receives the information/message announcing/requesting the resumption of the NBIFOM, the P-GW 530/PCRF 550 resumes or activates the NBIFOM. The operation of the P-GW 530/PCRF 550 will be described in detail as below.

The P-GW 530/the PCRF 550 marks the suspension/resumption of the NBIFOM in a PDN connection related context while storing all of NBIFOM related information regarding the corresponding PDN connection based on the information/message/indication received from the UE 100 or the MME 510 and information (e.g., preset information) acquired through the PCC interaction.

As the NBIFOM is suspended/deactivated, the P-GW 530/the PCRF 550 may not request the update of the routing rule of the network-initiated NBIFOM.

As described above, while the NBIFOM is suspended/deactivated, the P-GW 530/the PCRF 550 may not create the routing rule. Alternatively, the P-GW 530/the PCRF 550 may not request only the update of the routing rule instead of creating and storing the routing rule by preparing for the situation in which the NBIFOM is resumed.

Alternatively, during the suspension/deactivation of the NBIFOM, the P-GW 530/PCRF 550 may create the routing rule and transfer the created routing rule to the UE 100 through the update request procedure of the network-initiated routing rule, but when the NBIFOM is resumed afterwards, the P-GW 530/PCRF 550 may announce the resumption of the NBIFOM to the UE.

IV-2. Default Access Configuration Operation of UE/P-GW in NBIFOM Suspension Situation When traffic to which the routing rule possessed by the UE/P-GW is not applied occurs, the UE/P-GW is supposed to send the traffic through a default access. In the NBIFOM suspension situation, the UE/P-GW may decide whether to maintain or change the default access according to a value specified for the suspension or use an access pre-set in the UE/P-GW as the default access. For example, when the default access is configured as the WLAN, the UE may change the default access to the 3GPP access while announcing/requesting the suspension of the NBIFOM. When there is no information regarding the default access, the UE/P-GW may change the default access using the pre-set information. When the default access is continuously maintained as the WLAN, the traffic is not transmitted through the WLAN access and is dropped.

IV-3. Operation for Additional PDN Connection in NBIFOM Suspension Situation The UE/P-GW may decide whether to continuously maintain or release the additional PDN connection in the suspension situation of the NBIFOM. When the UE/P-GW releases the additional PDN connection, the PDN connection needs to be explicitly released through a PDN disconnection procedure by the request of the UE or a bearer deactivation procedure initiated by the P-GW. When there is information indicating that the additional PDN connection needs to be released in the information/message announcing the suspension, the additional PDN connection may be released.

The UE is supposed to continuously maintain the additional PDN connection and when a loss of the additional PDN connection occurs, the UE transmits an access loss indication to the P-GW.

Contents described up to now may be implemented by hardware. This will be described with reference to FIG. 18.

Figure 18:
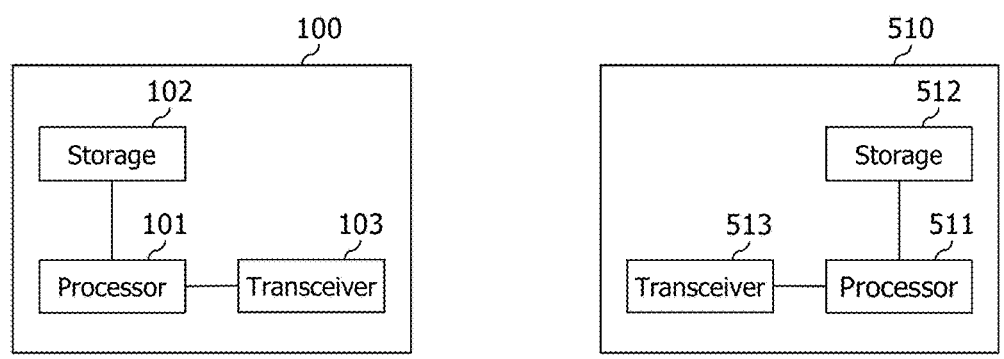
FIG. 18 is a configuration block diagram of a UE 100 and an MME 510 according to an embodiment of the present invention.

FIG. 18 is a configuration block diagram of a UE 100 and an MME 510 according to an embodiment of the present invention.

As illustrated in FIG. 18, the UE 100 includes a storage 101, a controller 102, and a transceiver 103. In addition, the MME 510 includes a storage 511, a controller 512, and a transceiver 513.

The storages 101 and 511 store the aforementioned method.

The controllers 102 and 512 control the storages 101 and 511 and the transceivers 103 and 513. The controllers 102 and 512 control the storages 101 and 511 and the transceivers 103 and 513. In addition, the controllers 102 and 512 transmit the aforementioned signals through the transceivers 103 and 513.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

What is claimed is:

1. A method for performing network selection and traffic routing, the method performed by a mobility management entity (MME) and comprising:
   deciding, by the MME, whether to offload a public data network (PDN) connection to a wireless local area network (WLAN) based on an indication for WLAN offloadability acquired from a home subscriber server (HSS) when a request for the PDN is received from a user equipment (UE);
   transmitting, by the MME and to the UE, a message including a decision result for the PDN connection and information on a network based IP flow mobility (NBIFOM) capability; and
   transmitting, by the MME, the decision result for the PDN connection to at least one of a PDN gateway (P-GW) and a policy and charging rule function (PCRF),
   wherein the decision result for the PDN connection and the information on the NBIFOM capability are used for at least one of the UE, the P-GW, and the PCRF to use the NBIFOM capability so as to suspend resume the NBIFOM capability.

2. The method of claim 1, wherein the information on the NBIFOM capability indicates that the NBIFOM capability is enabled to be performed, while when the decision result for the PDN connection indicates that the offloading to the WLAN is impossible, at least one of the UE, the P-GW, and the PCRF suspends the NBIFOM capability.

3. The method of claim 1, wherein when an update request for the PDN connection is received from the UE or a request for a new PDN connection is received, the deciding of whether to offload to the WLAN, the transmitting to the UE, and the transmitting to at least one of the P-GW and the PCRF are performed again.

4. The method of claim 3, wherein the transmitting to the UE and the transmitting to at least one of the P-GW and the PCRF are performed again and thereafter, the NBIFOM function is enabled to be performed with respect to the information on the NBIFOM capability, which is transmitted again and when the decision result for the PDN connection, which is transmitted again indicates that it is possible to offload to the WLAN, at least one of the UE, the P-GW, and the PCRF decides whether to resume the NBIFOM capability.

5. The method of claim 3, wherein in performing the transmitting to at least one of the P-GW and the PCRF again, only when the decision result for the PDN connection to be transmitted again has a result value contrary to the decision result for the PDN connection before performing the deciding of whether to offload to the WLAN, the transmitting to at least one of the P-GW and the PCRF is performed again.

6. A method for performing network selection and traffic routing, the method performed by a mobility management entity (MME) and comprising:
deciding, by the MME, whether to offload a PDN connection to a WLAN based on an indication for WLAN offloadability acquired from an HSS when a request for the PDN connection is received from a user equipment (UE);
determining, by the MME, whether there is a conflict between a decision result for the PDN connection and an NBIFOM capability;
transmitting, by the MME, to the UE a message additionally including information indicating suspension of the NBIFOM capability based on whether there is the conflict in addition to the decision result for the PDN connection and the NBIFOM capability; and
transmitting, by the MME, to at least one of a P-GW and a PCRF the information indicating the suspension of the NBIFOM capability based on whether there is the conflict or the message including the information.

7. The method of claim 6, wherein in the determining of whether there is the conflict, when the information on the NBIFOM capability indicates that the NBIFOM capability is enabled to be performed, while the decision result for the PDN connection indicates that it is impossible to offload the PDN connection to the WLAN, it is determined that there is the conflict.

8. The method of claim 6, wherein when an update request for the PDN connection is received from the UE or a request for a new PDN connection is received, the deciding of whether to offload to the WLAN and the determining of whether there is the conflict are performed again.

9. The method of claim 8, wherein in the performing of the determining of whether there is the conflict again, when the information on the NBIFOM capability, which is newly received from the P-GW indicates that the NBIFOM capability is enabled to be performed and the decision result for the PDN connection which is decided again indicates that it is possible to offload the PDN connection to the WLAN, it is determined that the conflict is resolved.

10. An apparatus for performing network selection and traffic routing, comprising:
a transceiver; and
a processor controlling the transceiver,
wherein the processor
decides whether to offload a PDN connection to a WLAN based on an indication for WLAN offloadability acquired from an HSS when a request for the PDN connection is received from a user equipment (UE),
transmits to the UE a message including a decision result for the PDN connection and information on an NBIFOM capability, and
performs a procedure for transmitting the decision result for the PDN connection to at least one of a P-GW and a PCRF, and the decision result for the PDN connection and the information on the NBIFOM capability are used for at least one of the UE, the P-GW, and the PCRF to use the NBIFOM capability so as to suspend resume the NBIFOM capability.

11. The apparatus of claim 10, wherein the information on the NBIFOM capability indicates that the NBIFOM capability is enabled to be performed, while when the decision result for the PDN connection indicates that the offloading to the WLAN is impossible, at least one of the UE, the P-GW, and the PCRF suspends the NBIFOM capability.

12. The apparatus of claim 10, wherein when an update request for the PDN connection is received from the UE or a request for a new PDN connection is received, the processor decides whether to offload to the WLAN, transmits the request to the UE, and performs the procedure for transmitting the request to at least one of the P-GW and the PCRF again.

13. The apparatus of claim 12, wherein the request is transmitted to the UE and the procedure for transmitting the request to at least one of the P-GW and the PCRF is performed again and thereafter, the NBIFOM function is enabled to be performed with respect to the information on the NBIFOM capability, which is transmitted again and when the decision result for the PDN connection, which is transmitted again indicates that it is possible to offload to the WLAN, at least one of the UE, the P-GW, and the PCRF decides whether to resume the NBIFOM capability.

14. The apparatus of claim 12, wherein only when the decision result for the PDN connection to be transmitted again has a result value contrary to the decision result for the PDN connection before performing the deciding of whether to offload to the WLAN, the processor performs the procedure for transmitting the request to at least one of the P-GW and the PCRF again.

15. An apparatus for performing network selection and traffic routing, comprising:
a transceiver; and
a processor controlling the transceiver,
wherein the processor
decides whether to offload a PDN connection to a WLAN based on an indication for WLAN offloadability acquired from an HSS when a request for the PDN connection is received from a user equipment (UE),
determines whether there is a conflict between a decision result for the PDN connection and an NBI capability,
transmits to the UE a message additionally including information indicating suspension of the NBIFOM capability based on whether there is the conflict in addition to the decision result for the PDN connection and the NBIFOM capability, and
performs a procedure for transmitting to at least one of a P-GW and a PCRF the information indicating the suspension of the NBIFOM capability based on whether there is the conflict or the message including the information.

16. The apparatus of claim 15, wherein when the information on the NBIFOM capability indicates that the NBIFOM capability is enabled to be performed, while the decision result for the PDN connection indicates that it is impossible to offload the PDN connection to the WLAN, the processor determines that there is the conflict.

17. The apparatus of claim 15, wherein when an update request for the PDN connection is received from the UE or a request for a new PDN connection is received, the processor performs the procedure for deciding whether to offload to the WLAN and determining whether there is the conflict are performed again.

18. The apparatus of claim 17, wherein when the information on the NBIFOM capability, which is newly received from the P-GW indicates that the NBIFOM capability is enabled to be performed and the decision result for the PDN connection which is decided again indicates that it is possible to offload the PDN connection to the WLAN, the processor determines that the conflict is resolved.

* * * * *